US012620747B2

(12) United States Patent
Horino et al.

(10) Patent No.: US 12,620,747 B2
(45) Date of Patent: May 5, 2026

(54) CONNECTOR, CONNECTOR MODULE, AND ELECTRONIC APPARATUS

(71) Applicant: KYOCERA CORPORATION, Kyoto (JP)

(72) Inventors: Shintaro Horino, Yokohama (JP); Masayoshi Kakino, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 379 days.

(21) Appl. No.: 17/794,552

(22) PCT Filed: Jan. 22, 2021

(86) PCT No.: PCT/JP2021/002162
§ 371 (c)(1),
(2) Date: Jul. 21, 2022

(87) PCT Pub. No.: WO2021/153435
PCT Pub. Date: Aug. 5, 2021

(65) Prior Publication Data

US 2023/0064606 A1 Mar. 2, 2023

(30) Foreign Application Priority Data

Jan. 29, 2020 (JP) ................................ 2020-012331

(51) Int. Cl.
*H01R 12/71* (2011.01)
*H01R 13/41* (2006.01)
(Continued)

(52) U.S. Cl.
CPC ........... *H01R 13/50* (2013.01); *H01R 12/716* (2013.01); *H01R 13/41* (2013.01); *H01R 13/6585* (2013.01)

(58) Field of Classification Search
CPC ...... H01R 13/50; H01R 12/716; H01R 13/41; H01R 13/6585; H01R 12/7029;
(Continued)

(56) References Cited

U.S. PATENT DOCUMENTS 7,059,908 B2 * 6/2006 Yamaguchi ........ H01R 13/6583 439/607.17
7,168,986 B1 * 1/2007 Peng .................... H01R 12/716 439/607.04
(Continued)

FOREIGN PATENT DOCUMENTS

JP 2006059589 A 3/2006
JP 2016042489 A 3/2016
(Continued)

*Primary Examiner* — Abdullah A Riyami
*Assistant Examiner* — Nelson R. Burgos-Guntin
(74) *Attorney, Agent, or Firm* — Duane Morris LLP

(57) ABSTRACT

A connector (10) according to the present disclosure includes a first contact (30*a*), a second contact (30*b*), and an insulator (20). The insulator (20) includes a first attachment portion (21) to which the first contact (30*a*) is attached and a second attachment portion (22) that is formed continuously with the first attachment portion (21) and to which the second contact (30*b*) is attached. The first attachment portion (21) includes a first wall portion (213) to which the first contact (30*a*) is attached. The second attachment portion (22) includes a second wall portion (222*b*) that is separated from the first wall portion (213) and to which the second contact (30*b*) is attached.

17 Claims, 18 Drawing Sheets

(51) Int. Cl.
*H01R 13/50* (2006.01)
*H01R 13/6585* (2011.01)

(58) Field of Classification Search
CPC .. H01R 12/707; H01R 13/6594; H01R 12/73; H01R 13/6581; H01R 12/71; H01R 12/77
See application file for complete search history.

(56) References Cited

U.S. PATENT DOCUMENTS

| | | | | |
|---|---|---|---|---|
| 9,397,425 | B2 | 7/2016 | Chen | |
| 11,355,882 | B2 | 6/2022 | Matsuno | |
| 11,532,904 | B2 * | 12/2022 | Amemori | H01R 12/716 |
| 2015/0132985 | A1 * | 5/2015 | Choi | H01R 13/6335 439/345 |
| 2017/0033505 | A1 * | 2/2017 | Ozeki | H01R 13/6581 |
| 2018/0115098 | A1 * | 4/2018 | Little | H01R 12/716 |
| 2018/0151967 | A1 * | 5/2018 | Chen | H01R 12/57 |
| 2019/0140394 | A1 | 5/2019 | Tanaka et al. | |
| 2019/0190209 | A1 * | 6/2019 | Horino | H01R 13/6582 |
| 2019/0348780 | A1 * | 11/2019 | Kitazawa | H01R 13/6587 |
| 2021/0111521 | A1 | 4/2021 | Amemori | |
| 2021/0175649 | A1 * | 6/2021 | Amemori | H01R 12/716 |
| 2022/0021159 | A1 * | 1/2022 | Hoshiba | H01R 13/6597 |
| 2023/0402781 | A1 * | 12/2023 | Morita | H01R 13/42 |

FOREIGN PATENT DOCUMENTS

| | | | |
|---|---|---|---|
| JP | 2018081869 | A | 5/2018 |
| KR | 20160089216 | A | 7/2016 |
| TW | M497353 | U | 3/2015 |
| WO | 2020003731 | A1 | 1/2020 |
| WO | 2020039666 | A1 | 2/2020 |

* cited by examiner

CONNECTOR, CONNECTOR MODULE, AND ELECTRONIC APPARATUS

CROSS-REFERENCE TO RELATED APPLICATIONS

The present application claims priority of Japanese Patent Application No. 2020-012331, filed in Japan Patent Office on Jan. 29, 2020, the entire contents of the disclosure of which are incorporated herein for reference.

TECHNICAL FIELD

The present disclosure relates to a connector, a connector module, and an electronic apparatus.

BACKGROUND ART

To date, a technology related to a connector module that includes a receptacle connector and a plug connector that are mounted on different circuit boards to electrically connect these circuit boards is widely known.

For example, PTL 1 discloses a shielded electrical connector that can prevent occurrence of troubles due to noise leakage, such as disturbance to data exchange in electronic apparatuses and communication failure, and that can achieve reduction in size.

In recent years, reduction in weight and size and increase in multifunctionality are required for electronic apparatuses, and, likewise, reduction in weight and size and increase in multifunctionality are required also for components inside of electronic apparatuses. In view of increase in multifunctionality, for example, a connector incorporated in electronic apparatuses may be connected to a combination of a signal circuit and a large-electric-current circuit or to a combination of a signal circuit and a high-frequency circuit.

CITATION LIST

Patent Literature

PTL 1: Japanese Unexamined Patent Application Publication No. 2006-059589

SUMMARY OF INVENTION

A connector according to one embodiment of the present disclosure includes an insulator including a first attachment portion to which a first contact is attached and a second attachment portion that is formed continuously with the first attachment portion and to which a second contact is attached.

The first attachment portion includes a first wall portion to which the first contact is attached.

The second attachment portion includes a second wall portion that is separated from the first wall portion and to which the second contact is attached.

A connector module according to one embodiment of the present disclosure includes:

a first connector including a first contact, a second contact, and a first insulator including a first attachment portion to which the first contact is attached and a second attachment portion that is formed continuously with the first attachment portion and to which the second contact is attached; and a second connector that is connectable to the first connector, the second connector including a third contact that is in contact with the first contact in a connected state in which the first connector and the second connector are connected to each other, a fourth contact that is in contact with the second contact in the connected state, and a second insulator including a third attachment portion that is fitted to the first insulator in the connected state and to which the third contact is attached and a fourth attachment portion that is formed continuously with the third attachment portion and to which the fourth contact is attached.

The first attachment portion includes a first wall portion to which the first contact is attached.

The second attachment portion includes a second wall portion that is separated from the first wall portion and to which the second contact is attached.

The third attachment portion includes a third wall portion to which the third contact is attached.

The fourth attachment portion includes a fourth wall portion that is separated from the third wall portion and to which the fourth contact is attached.

An electronic apparatus according to one embodiment of the present disclosure includes the connector or the connector module.

DESCRIPTION OF EMBODIMENTS

In the aforementioned connector, which is to be incorporated in electronic apparatuses, in a case where a plurality of contacts are used for circuits of different types, one contact and another contact need to be disposed in the connector in a state of being separated from each other at a predetermined distance in order to, for example, insulate the contacts from each other and to suppress influence on the transmission characteristics of each other. On the other hand, an insulator included in the connector needs to maintain a predetermined strength so as to obtain a sufficient strength as a connector, even though a plurality of contacts that are separated from each other are attached to the insulator. For example, in a case where the connector is reduced in size in accordance with reduction in weight and size of electronic apparatuses, the strength of the insulator is particularly important in order to obtain a sufficient strength as a connector. However, in the shielded electrical connector described in PTL 1, sufficient consideration is not given regarding the strength of the insulator.

With a connector, a connector module, and an electronic apparatus according to one embodiment of the present disclosure, the strength of an insulator to which a plurality of contacts are attached is improved.

Hereafter, one embodiment of the present disclosure will be described in detail with reference to the drawings. The front-back direction, the left-right direction, and the up-down direction in the following description are based on the directions of arrows in the figures. The directions of arrows in FIGS. 1, 2, and 8 to 18 are consistent with each other between different figures. The directions of arrows in FIGS. 3 to 7 are consistent with each other between different figures. In some figures, illustrations of circuit boards CB1 and CB2 (described below) are omitted for the purpose of simplicity of illustration.

Figure 1:
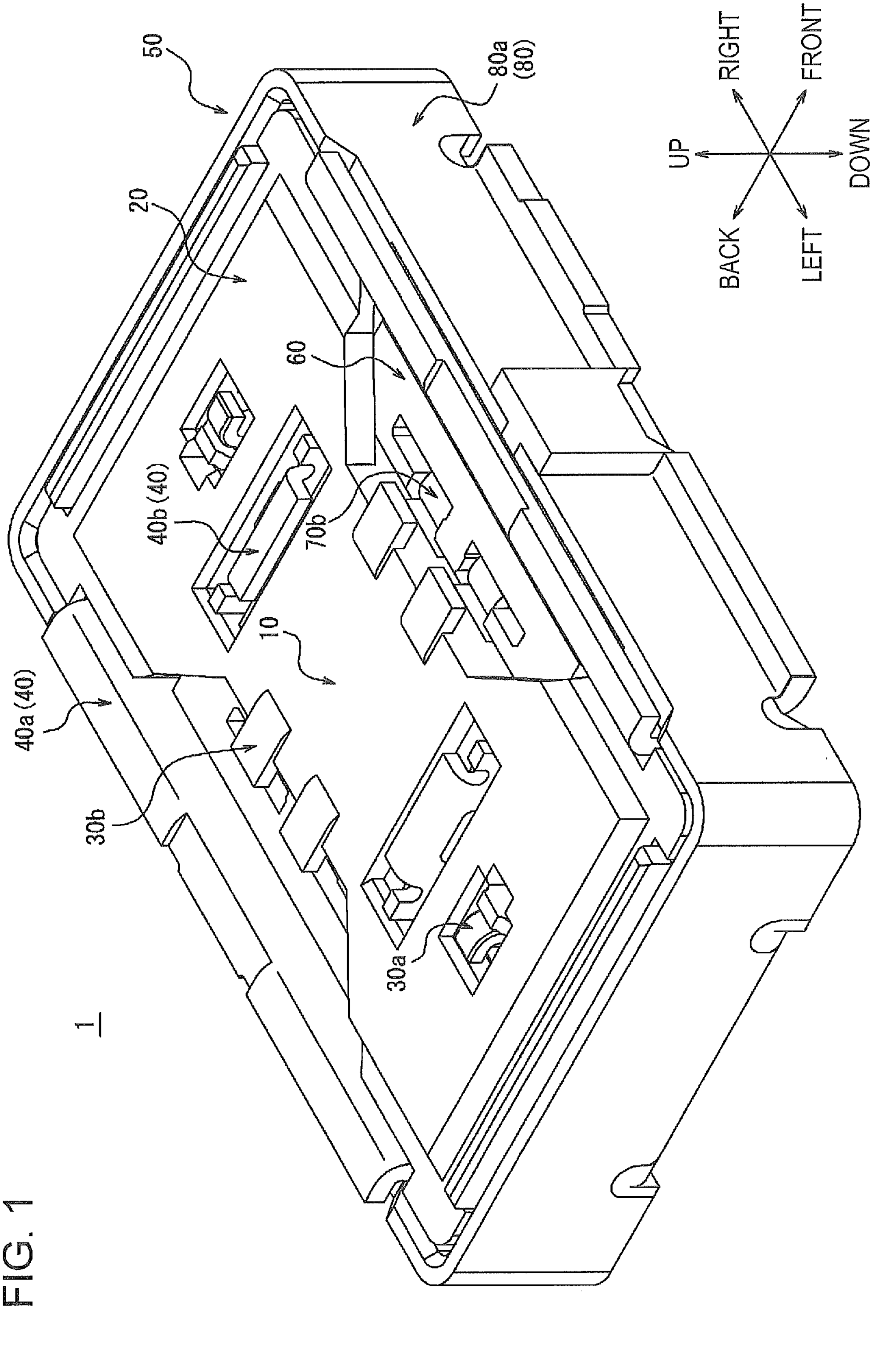
FIG. 1 is an external top perspective view illustrating a connector according to one embodiment in a state in which a first connector and a second connector are connected to each other.
Figure 2:
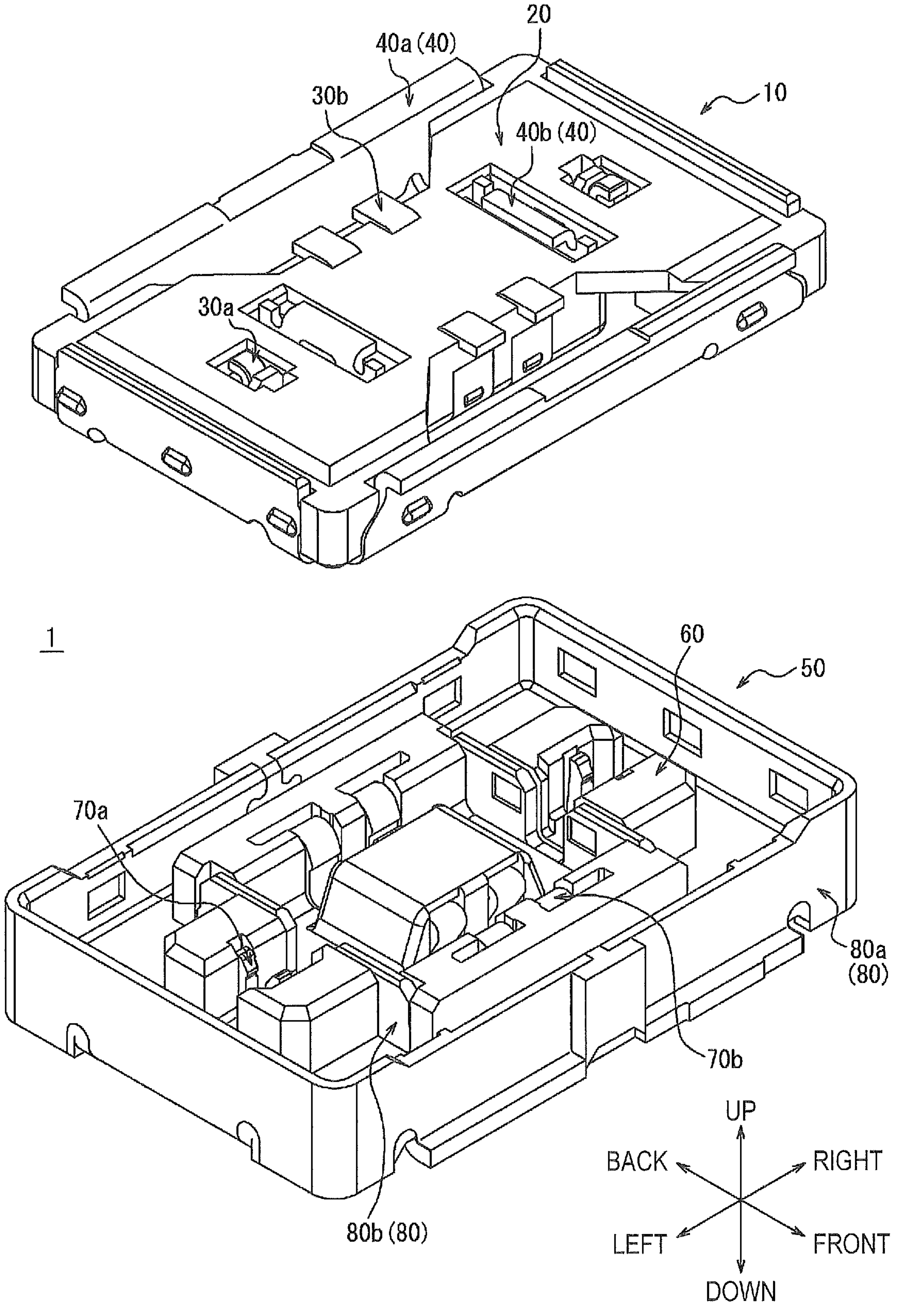
FIG. 2 is an external top perspective view illustrating the connector according to one embodiment in a state in which the first connector and the second connector are separated from each other.

FIG. 1 is an external top perspective view illustrating a connector 1 according to one embodiment in a state in which a first connector 10 and a second connector 50 are connected to each other. FIG. 2 is an external top perspective view illustrating the connector 1 according to one embodiment in a state in which the first connector 10 and the second connector 50 are separated from each other.

For example, as illustrated in FIG. 2, the connector 1 includes the first connector 10 and the second connector 50 that are connectable to each other. The first connector 10 includes a first insulator 20 and a first contact 30*a* that is attached to the first insulator 20. The first connector 10 includes a second contact 30*b*, which is different from the first contact 30*a*, and a first shield member 40 that are attached to the first insulator 20.

The second connector 50 is connectable to the first connector 10. The second connector 50 includes a second insulator 60 that is fitted to the first insulator 20 in a connected state in which the first connector 10 and the second connector 50 are connected to each other. The second connector 50 includes a third contact 70*a* that is in contact with the first contact 30*a* in a fitted state in which the first insulator 20 and the second insulator 60 are fitted to each other and that is attached to the second insulator 60. The second connector 50 includes a fourth contact 70*b* that is in contact with the second contact 30*b* in the fitted state and that is attached to the second insulator 60. The fourth contact 70*b* differs from the third contact 70*a*. The second connector 50 includes a second shield member 80 that is attached to the second insulator 60.

As described above, shield members of the connector 1 are attached to the first insulator 20 and the second insulator 60. To be more specific, the shield members include the first shield member 40 attached to the first insulator 20 and the second shield member 80 attached to the second insulator 60.

In the following description, it is assumed that, for example, the second connector 50 according to one embodiment is a receptacle connector. In the following description, it is assumed that the first connector 10 is a plug connector. In the following description, it is assumed that the second connector 50, in which the third contact 70*a* and the fourth contact 70*b* are elastically deformed in the fitted state in which the first insulator 20 and the second insulator 60 are fitted to each other, is a receptacle connector. In the following description, it is assumed that the first connector 10, in which the first contact 30*a* and the second contact 30*b* do not elastically deform, is a plug connector. The types of the first connector 10 and the second connector 50 are not limited to these. For example, the second connector 50 may serve as a plug connector, and the first connector 10 may serve as a receptacle connector.

In the following description, it is assumed that the first connector 10 and the second connector 50 are to be mounted respectively on the circuit boards CB1 and CB2. In a connected state of being connected to each other, the first connector 10 and the second connector 50 electrically connect the circuit board CB1 and the circuit board CB2. The circuit boards CB1 and CB2 may be rigid boards, or may be any circuit boards other than rigid boards. For example, at least one of the circuit boards CB1 and CB2 may be a flexible printed circuit board.

In the following description, it is assumed that the first connector 10 and the second connector 50 are connected to each other in a direction that is perpendicular to the circuit boards CB1 and CB2. The first connector 10 and the second connector 50 are connected to each other, for example, along the up-down direction. The connection method is not limited to this. The first connector 10 and the second connector 50 may be connected to each other in a direction parallel to the circuit boards CB1 and CB2. The first connector 10 and the second connector 50 may be connected to each other so that one of these is perpendicular to a circuit board to which the one is mounted and the other of these is parallel to a circuit board to which the other is mounted.

The "first direction of the connector 1" described in the claims is, for example, the longitudinal direction of the connector 1, and corresponds to the left-right direction. The "second direction perpendicular to a first direction of the connector 1" is, for example, the transversal direction of the connector 1, and corresponds to the front-back direction.

The connector 1 according to one embodiment includes two pairs of the first contacts 30*a* and the third contacts 70*a* that are in contact with each other in a connected state in which the first connector 10 and the second connector 50 are connected to each other. The connector 1 has a shield structure that shields each pair of the first contact 30*a* and the third contact 70*a* that are in contact with each other in a fitted state in which the first insulator 20 and the second insulator 60 are fitted to each other.

Figure 3:
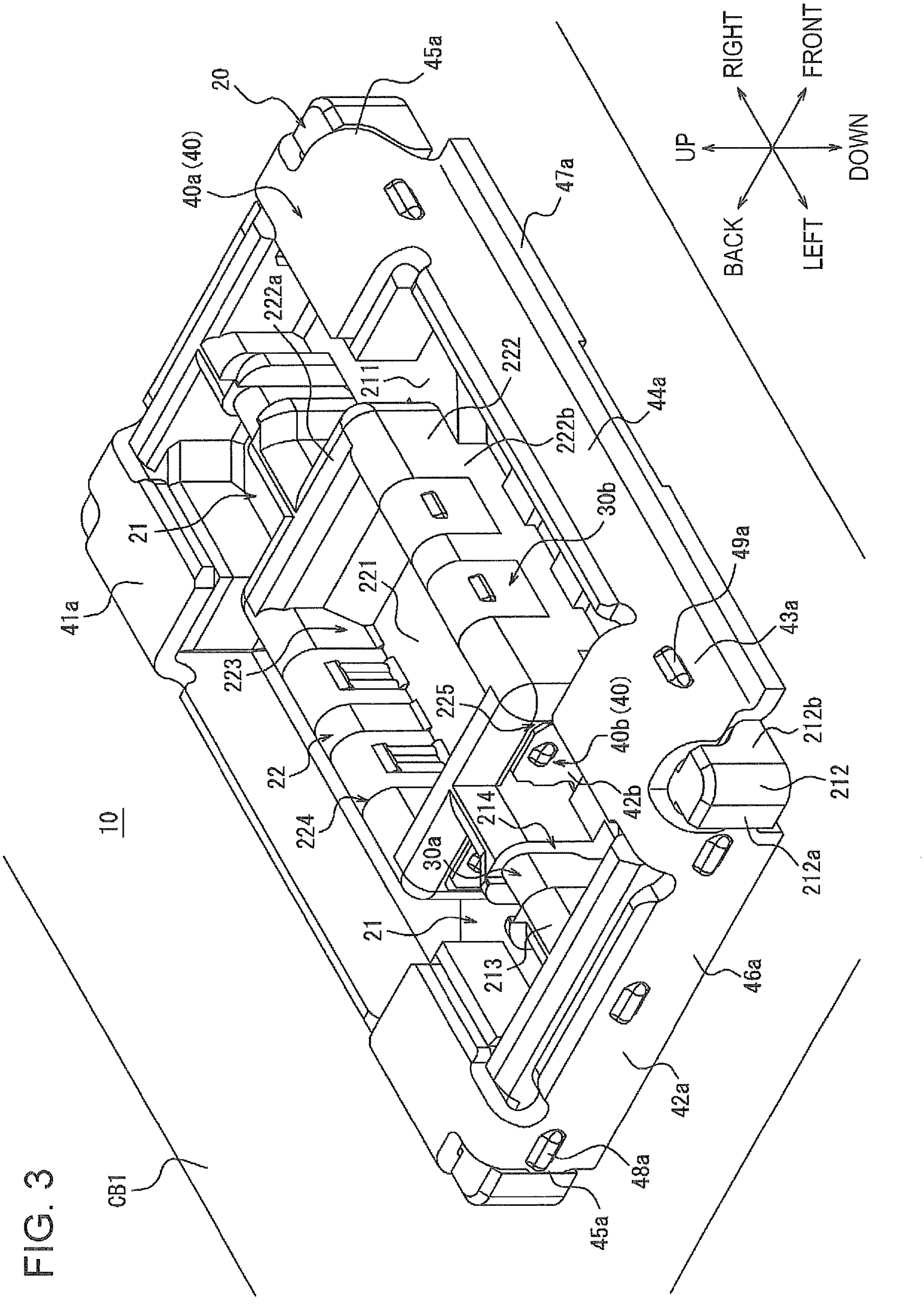
FIG. 3 is an external top perspective view illustrating only the first connector of FIG. 1.
Figure 4:
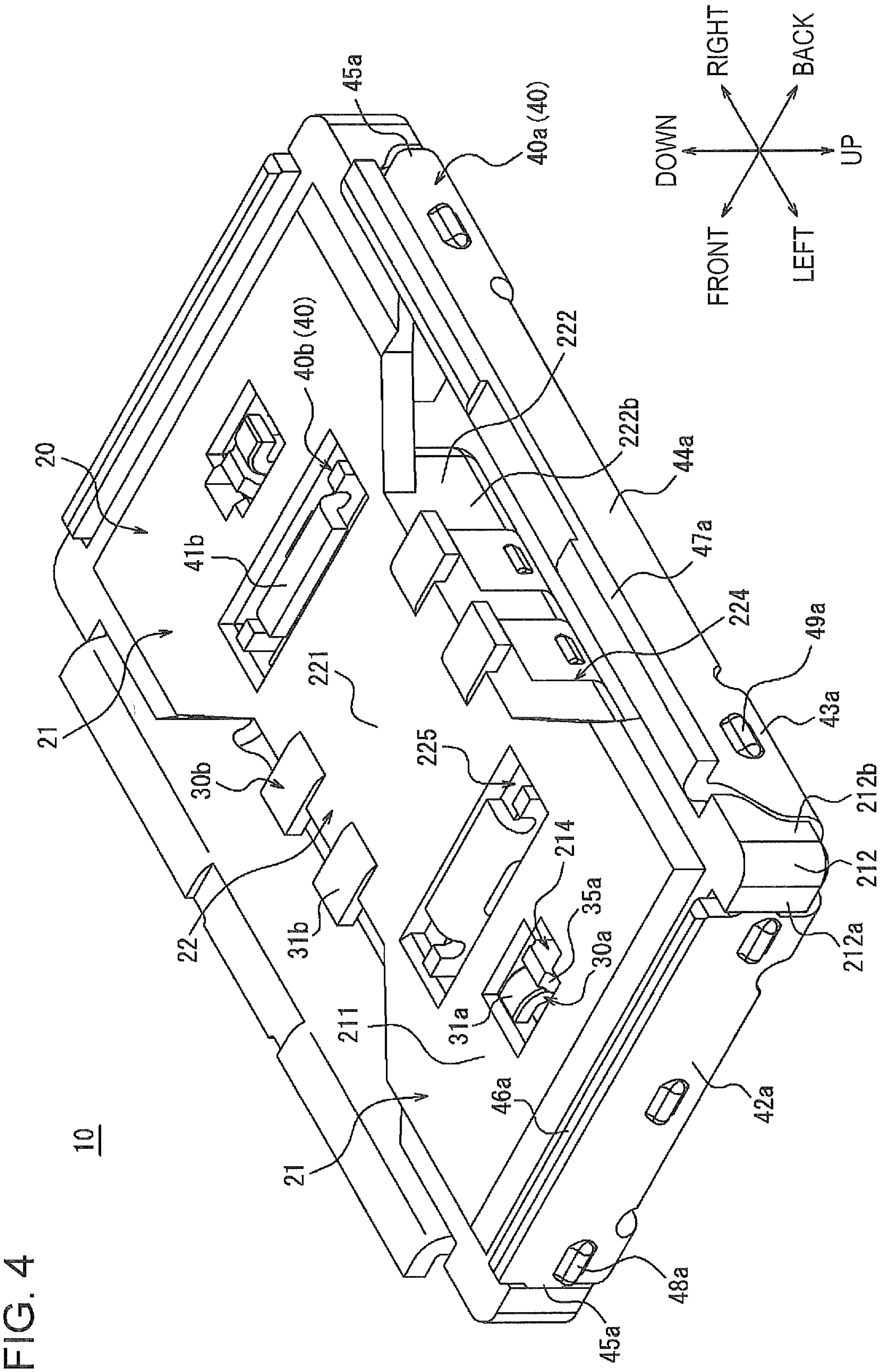
FIG. 4 is an external bottom perspective view illustrating only the first connector of FIG. 1.

FIG. 3 is an external top perspective view illustrating only the first connector 10 of FIG. 1. FIG. 4 is a bottom perspective view illustrating only the first connector 10 of FIG. 1. The first connector 10 is obtained, for example, by integrally forming the second contact 30*b* and the first insulator 20 by insert molding and by press-fitting the first contact 30*a* and the first shield member 40 into the first insulator 20.

Figure 5:
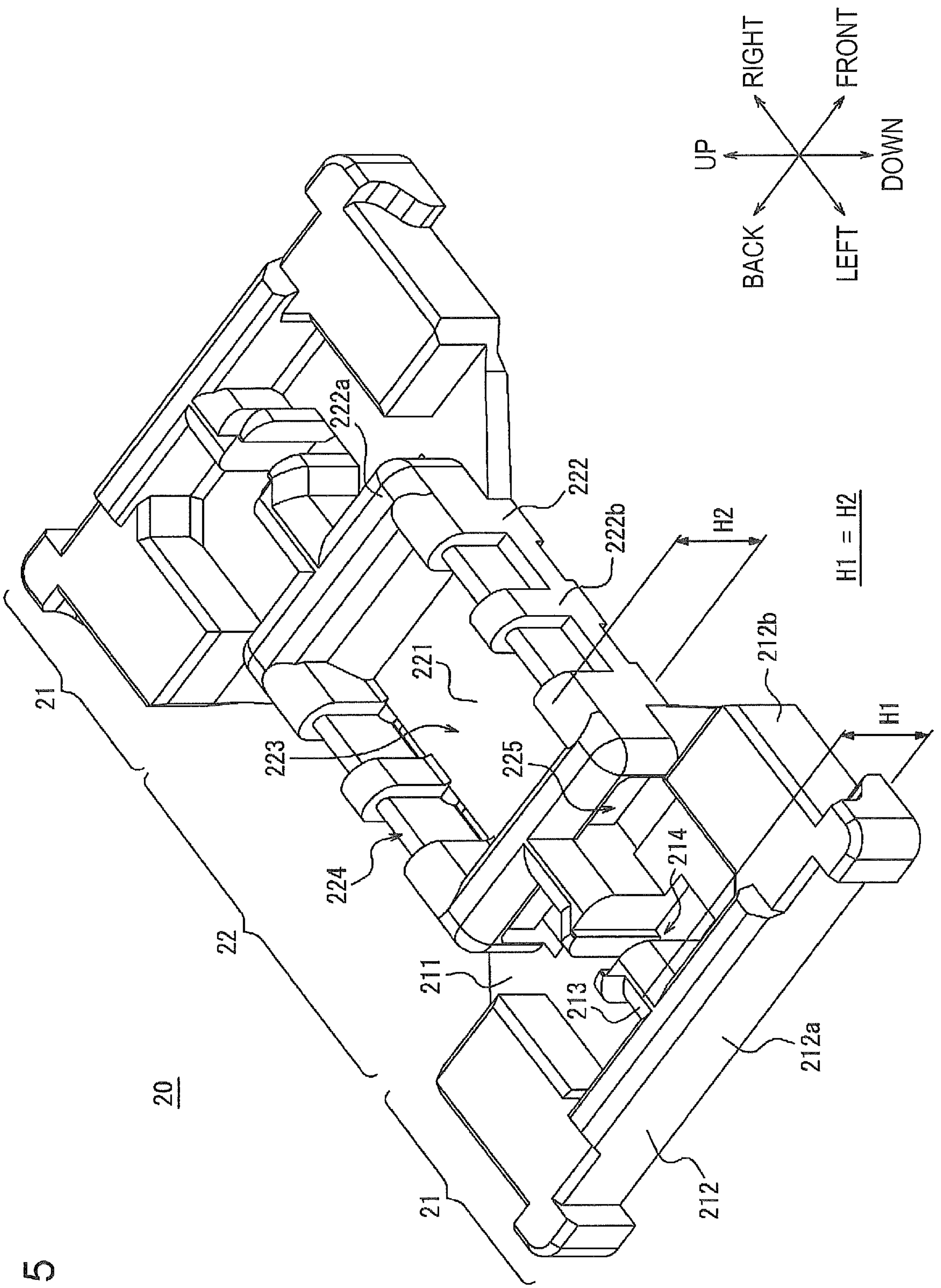
FIG. 5 is an external top perspective view illustrating only a first insulator of the first connector of FIG. 3.

FIG. 5 is an external top perspective view illustrating only the first insulator 20 of the first connector 10 of FIG. 3. The first insulator 20 of the first connector 10 is made of an insulating and heat-resistant synthetic resin material. The first insulator 20 extends in a plate-like shape in the left-right direction.

As illustrated in FIGS. 3 and 5, the first insulator 20 includes, as large components, a first attachment portion 21 to which the first contact 30*a* is attached, and a second attachment portion 22 that is formed continuously with the first attachment portion 21 and to which the second contact 30*b* is attached. The first attachment portion 21 is formed continuously with the second attachment portion 22 along the left-right direction so as to be positioned at an outer end in the left-right direction. In the first insulator 20, a pair of the first attachment portions 21 are respectively disposed on the left side and the right side of the second attachment portion 22, and the pair of first attachment portions 21 and the second attachment portion 22 are integrally formed.

The first attachment portion 21 includes a bottom plate portion 211 that extends outward from an end part, in the left-right direction, of the second attachment portion 22 while increasing the front-back width thereof and that forms a lower part thereof. The first attachment portion 21 includes an outer peripheral wall 212 that protrudes upward in an angular-U-shape from an upper surface of the bottom plate portion 211 and that forms a part of a peripheral edge portion. The outer peripheral wall 212 includes a first wall 212*a* that extends in the front-back direction and a pair of second walls 212*b* that extend in the left-right direction.

The first attachment portion 21 includes a first wall portion 213 to which the first contact 30*a* is attached. The first wall portion 213 is surrounded by the outer peripheral wall 212 from the outside in the front-back direction and from both sides in the left-right direction. The first wall portion 213 is formed linearly from one end part of the first attachment portion 21 on the second attachment portion 22 side to the other end part on the opposite side in the left-right direction in a state in which the first contact 30*a* is interposed in the left-right direction. The height of the first wall portion 213 with respect to the circuit board CB1, on which the first connector 10 is mounted, is the same as the height of a second wall portion 222*b* (described below) with respect to the circuit board CB1. For example, the height H1 of the first wall portion 213 illustrated in FIG. 5 is the same as the height H2 of the second wall portion 222*b*. The position of the first wall portion 213 in the front-back direction is the same as the position of a central part of the second attachment portion 22 in the front-back direction.

The first attachment portion 21 has a first-contact holding groove 214 that is formed by cutting out a central part, in the left-right direction, of the first wall portion 213 along the up-down direction so as to extend through the bottom plate portion 211. The first-contact holding groove 214 holds the first contact 30*a* because the first contact 30*a* is press-fitted thereinto.

The second attachment portion 22 includes a bottom plate portions 221 that extends in the left-right direction so as to couple the bottom plate portions 211 of the first attachment portions 21 on the left and right sides and that forms a lower part thereof. The second attachment portion 22 includes an outer peripheral wall 222 that protrudes upward in a ring shape from an upper surface of the bottom plate portion 221 and that forms the entirety of a peripheral edge part thereof. The outer peripheral wall 222 includes a pair of transversal walls 222*a* that extend in the front-back direction and a pair of longitudinal walls 222*b* that extend in the left-right direction. The longitudinal walls 222*b* correspond to "second wall portion" described in the claims.

The second wall portion 222*b* is separated from the first wall portion 213 of the first attachment portion 21. The second contact 30*b* is attached to the second wall portion 222*b*. The height of the second wall portion 222*b* with respect to the circuit board CB1, on which the first connector 10 is mounted, is the same as the height of the first wall portion 213 with respect to the circuit board CB1.

The second attachment portion 22 has a fitting recess 223 that is defined by a space formed by the bottom plate portion 221 and the outer peripheral wall 222. The second attachment portion 22 has a second-contact holding groove 224 that is formed in an outer surface and an inner surface in the front-back direction of the second wall portion 222*b* of the outer peripheral wall 222. The second-contact holding groove 224 integrally holds the second contact 30*b*. As illustrated also in FIGS. 3 and 4, the second attachment portion 22 has a first-shield-member holding groove 225 that is formed in an end part of the second attachment portion 22 on the first attachment portion 21 side and that extends in the front-back direction. The first-shield-member holding groove 225 holds the first shield member 40 because the first shield member 40 is press-fitted thereinto.

Figure 6:
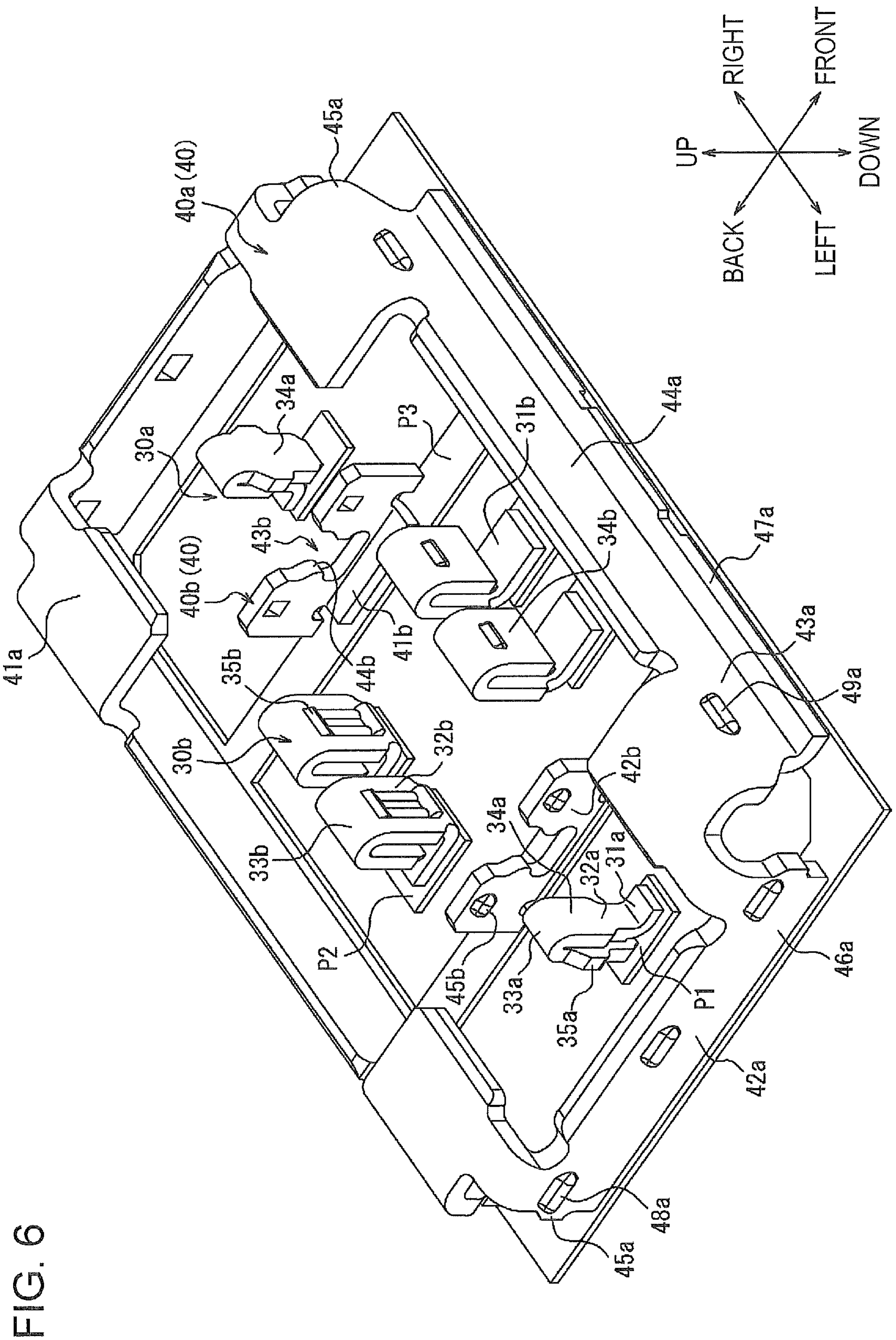
FIG. 6 is a top perspective view illustrating the first connector of FIG. 3 in a state in which only the first insulator is not illustrated.

FIG. 6 is a top perspective view illustrating the first connector 10 of FIG. 3 in a state in which only the first insulator 20 is not illustrated. FIG. 6 illustrates an example of a mount pattern of the circuit board CB1 on which the first connector 10 is mounted, in addition to the first contact 30*a*, the second contact 30*b*, and the first shield member 40 of the first connector 10. Referring mainly to FIG. 6, the configuration of each of the first contact 30*a* and the second contact 30*b* will be described in detail.

The first contact 30*a* is made by, for example, forming a thin plate of: a copper alloy, including phosphor bronze, beryllium copper, or titanium copper; or a Corson copper alloy into the shape illustrated in FIG. 6 by using a progressive die (stamping). The surface of the first contact 30*a* is plated by gold, tin, or the like after forming a sublayer by nickel plating. For example, the first contact 30*a* includes a contact that is used to transmit a radio frequency (RF) signal.

The first contact 30*a* includes a mount portion 31*a* that extends outward in the front-back direction in an L-shape. The first contact 30*a* includes a connection portion 32*a* that is formed upward in a reversely tapered shape from an upper end part of the mount portion 31*a*. The first contact 30*a* includes a curved portion 33*a* that extends upward in a U-shape from the connection portion 32*a*. The first contact 30*a* includes a pair of contacting portions 34*a* that are configured to include outer surfaces in the front-back direction on the front and back sides of the curved portion 33*a*. The first contact 30*a* includes a latch portion 35*a* that protrudes in the left-right direction from both side surfaces, in the left-right direction, on the free-end side of the curved portion 33*a*.

As illustrated also in FIG. 3, the first contact 30*a* is held with respect to the first-contact holding groove 214, because the latch portion 35*a* is latched to the first-contact holding groove 214. The first contact 30*a* is disposed so as to be interposed in the left-right direction by the first wall portion 213 of the first attachment portion 21. As illustrated also in FIG. 4, when the first contact 30*a* is held in the first-contact holding groove 214 of the first insulator 20, the mount portion 31*a* of the first contact 30*a* is exposed downward from the bottom plate portion 211.

The second contact 30*b* is made by, for example, forming a thin plate of: a copper alloy, including phosphor bronze, beryllium copper, or titanium copper; or a Corson copper alloy into the shape illustrated in FIG. 6 by using a progressive die (stamping). The surface of the second contact 30*b* is plated by gold, tin, or the like after forming a sublayer by nickel plating. For example, the second contact 30*b* includes a contact that is used to transmit a signal other than an RF signal.

The second contact 30*b* includes a mount portion 31*b* that extends outward in the front-back direction in an L-shape. The second contact 30*b* includes a contacting portion 32*b* that extends upward from an upper end part of the mount portion 31*b*. The contacting portion 32*b* has a contact surface that is included in an inner surface in the front-back direction. The contacting portion 32*b* is formed wider than the mount portion 31*b* in the left-right direction. The second contact 30*b* includes a curved portion 33*b* that extends outward in a U-shape from the contacting portion 32*b*. The second contact 30*b* includes a contacting portion 34*b* that is configured to include an outer surface, in the left-right direction, on the free-end side of the curved portion 33*b*. The second contact 30*b* includes a projection 35*b* that is formed on an upper part of the contact surface of the contacting portion 32*b*.

As illustrated also in FIGS. 3 and 4, the second contact 30*b* is integrally held with respect to the second-contact holding groove 224, because the entirety of an inner surface thereof excluding that of the mount portion 31*b* is in surface-contact with the second-contact holding groove 224. When the second contact 30*b* is held in the second-contact holding groove 224 of the first insulator 20, the tip of the mount portion 31*b* of the second contact 30*b* is positioned outside of the longitudinal wall 222*b* and inside of the first shield member 40.

Figure 7:
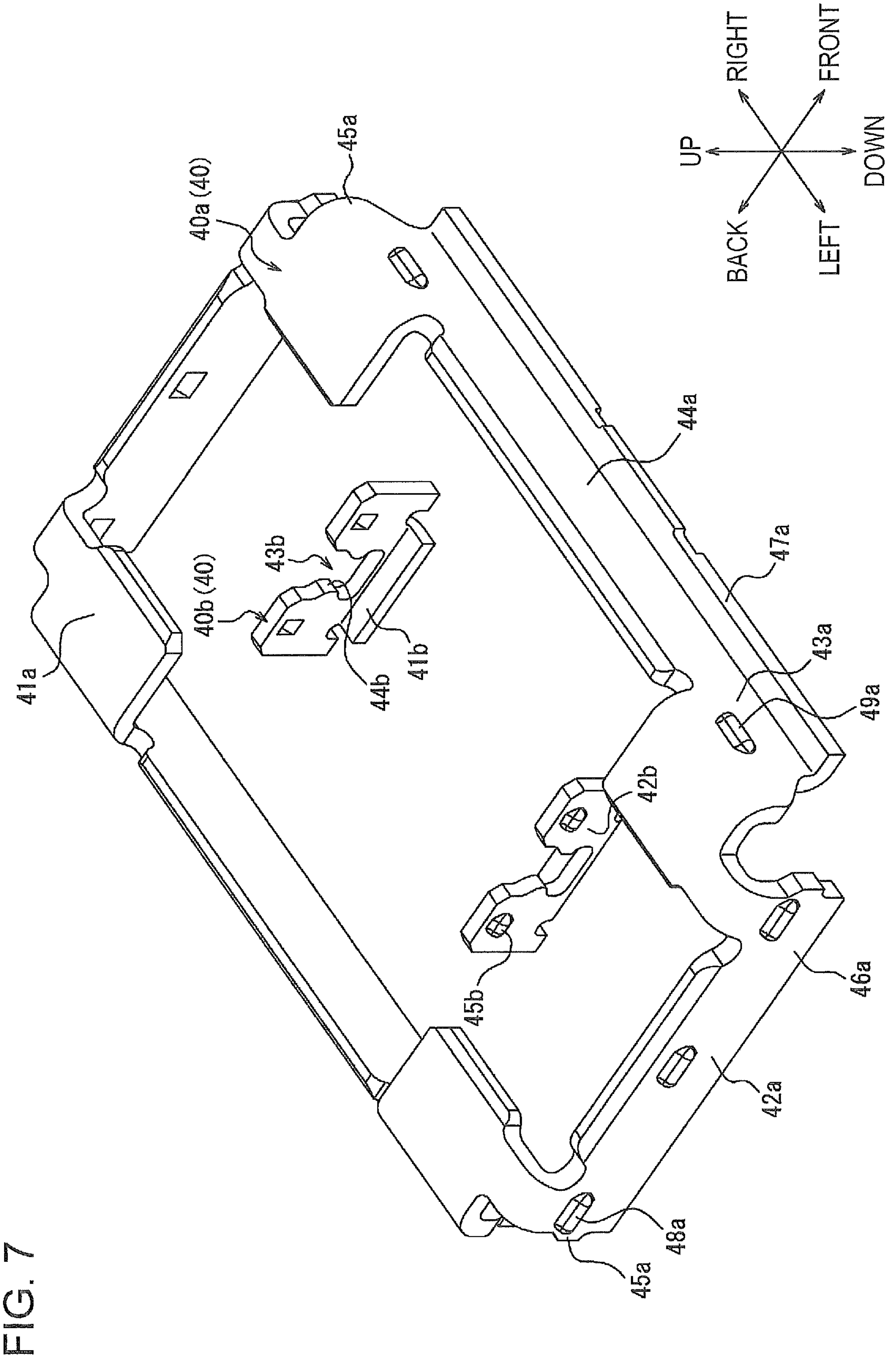
FIG. 7 is a top perspective view illustrating only a first shield member of FIG. 6.

FIG. 7 is a top perspective view illustrating only the first shield member 40 of FIG. 6. Referring mainly to FIGS. 6 and 7, the configuration of the first shield member 40 will be described in detail.

The first shield member 40 is made by forming a thin plate of any appropriate metal material into the shape illustrated in FIGS. 5 and 6 by using a progressive die (stamping). The method of forming the first shield member 40 includes a step of bending the thin plate in the plate-thickness direction after punching the thin plate.

The first shield member 40 includes, for example, three members. To be more specific, as illustrated also in FIGS. 3 and 4, the first shield member 40 includes a first member 40*a* that is attached to the first insulator 20 from above so as to surround the first insulator 20, the first contact 30*a*, and the second contact 30*b* from four directions. The first shield member 40 includes a pair of second members 40*b* that are attached to the first insulator 20 from below so as to be disposed respectively on the left and right sides of the second attachment portion 22 of the first insulator 20.

As illustrated also in FIGS. 3 and 4, the first member 40*a* is held by the first insulator 20 because the first member 40*a* is press-fitted into the angular-U-shaped outer peripheral wall 212 of the first attachment portion 21. The second member 40*b* is held by the first insulator 20 because the second member 40*b* is press-fitted into the first-shield-member holding groove 225 of the second attachment portion 22.

As illustrated in FIGS. 6 and 7, the second member 40*b* includes a mount portion 41*b* that extends inward in the left-right direction in an L-shape. The second member 40*b* includes a first shield portion 42*b* that extends upward from an upper end part of the mount portion 41*b*. As illustrated also in FIGS. 3 and 4, the first shield portion 42*b* is disposed at an end part of the second attachment portion 22 on the first attachment portion 21 side and extends in the front-back direction so as to overlap the first contact 30*a*. The first shield portion 42*b* is disposed inside of the first contact 30*a* in the left-right direction and extends in the front-back direction so as to overlap the first contact 30*a* along the left-right direction.

The second member 40*b* includes a cutout portion 43*b* that is cut out from above at a central part of the first shield portion 42*b* in the front-back direction. The second member 40*b* includes a latch portion 44*b* that protrudes inward in the front back direction from each of front and back side surfaces of the cutout portion 43*b*. As illustrated also in FIGS. 3 and 4, the second member 40*b* is held with respect to the first-shield-member holding groove 225, because the latch portion 44*b* is latched to the first wall portion 213. As illustrated also in FIG. 4, when the second member 40*b* is held in the first-shield-member holding groove 225 of the first insulator 20, the mount portion 41*b* of the second member 40*b* is exposed downward from the bottom plate portion 221.

The first shield portion 42*b* of the second member 40*b* includes a pair of contacting portions 45*b* that protrude on the front and back sides of an outer surface, in the left-right direction, of the first shield portion 42*b*. The pair of contacting portions 45*b* are disposed so that the cutout portion 43*b* is interposed therebetween from the front and back sides.

As illustrated in FIGS. 6 and 7, the first member 40*a* includes a base portion 41*a* that forms an upper end part thereof. The first member 40*a* includes a second shield portion 42*a* that extends from the base portion 41*a* outward in the left-right direction and extends in the front-back direction. The second shield portion 42*a* is disposed on a side opposite to the first shield portion 42*b* with respect to the first contact 30*a* and extends in the front-back direction so as to overlap the first contact 30*a*. The second shield portion 42*a* is disposed outside of the first contact 30*a* in the left-right direction and extends in the front-back direction so as to overlap the first contact 30*a* along the left-right direction.

The first member 40*a* includes a third shield portion 43*a* that extends from the base portion 41*a* outward in the front-back direction in an L-shape and that extends with a predetermined width in the left-right direction. The third shield portion 43*a* is disposed on each of two sides in the front-back direction with respect to the first contact 30*a* so as to overlap the first contact 30*a*. The third shield portion 43*a* extends in the left-right direction so as to overlap the first contact 30*a* along the front-back direction.

The first member 40*a* includes an outer-peripheral-side shield portion 44*a* that is disposed outside of the first insulator 20 along the left-right direction so as to overlap the second contact 30*b*. The outer-peripheral-side shield portion 44*a* extends in the left-right direction so as to overlap the second contact 30*b* along the front-back direction and to couple a pair of the third shield portions 43*a* that are positioned on the left and right sides.

As illustrated in FIG. 6, the second shield portion 42*a*, the third shield portion 43*a*, and the outer-peripheral-side shield portion 44*a* of the first member 40*a* are integrally formed with the base portion 41*a* in a ring shape, and surround all of the first contacts 30*a* and the second contacts 30*b* from the outside.

The first member 40*a* includes a latch portion 45*a* formed at each of four corners. The first member 40*a* includes a first mount portion 46*a* that extends downward linearly from a lower end part of the entirety of the second shield portion 42*a*, and a second mount portion 47*a* that extends from a lower end part of the entirety of the third shield portion 43*a* and a part of the outer-peripheral-side shield portion 44*a* outward in the front-back direction in an L-shape and that extends in the left-right direction.

As illustrated also in FIGS. 3 and 4, the first member 40*a* is held with respect to the first insulator 20 because the latch portion 45*a* is latched to the angular-U-shaped outer peripheral wall 212 of the first attachment portion 21. As illustrated also in FIG. 4, when the first member 40*a* is held by the first insulator 20, the first mount portion 46*a* and the second mount portion 47*a* of the first member 40*a* are positioned below the lower surface of the first insulator 20.

The second shield portion 42*a* of the first member 40*a* includes three first contacting portions 48*a* that protrude on an outer surface, in the left-right direction, of the second shield portion 42*a*. The third shield portion 43*a* of the first member 40*a* includes one second contacting portion 49*a* that protrudes on an outer surface, in the front-back direction, of the third shield portion 43*a*.

With the first connector 10 having the structure described above, the mount portion 31*a* of the first contact 30*a* is soldered to a circuit pattern formed on the mount surface of the circuit board CB1. The mount portion 31*b* of the second contact 30*b* is soldered to a circuit pattern formed on the mount surface. The first mount portion 46*a* and the second mount portion 47*a* of the first member 40*a*, and the mount portion 41*b* of the second member 40*b* are soldered to a ground pattern formed on the mount surface.

For example, as illustrated in FIG. 6, each of the mount portions 31*a* of the pair of first contacts 30*a* is soldered to one independent circuit pattern P1. For example, each of the mount portions 31*b* of the four second contacts 30*b* is soldered to one independent circuit pattern P2. For example, the first mount portion 46*a* and the second mount portion 47*a* of the first member 40*a*, and the mount portion 41*b* of the second member 40*b* are soldered to one ground pattern P3 that is integrally formed. Thus, it is possible to regard the first member 40*a* and the two second member 40*b* electrically as one shield member. In the way described above, the first connector 10 is mounted on the circuit board CB1. For example, electronic components other than the first connector 10, such as a communication module, are mounted on the mount surface of the circuit board CB1.

Referring mainly to FIGS. 8 to 14, the configuration of the second connector 50 will be described.

Figure 8:
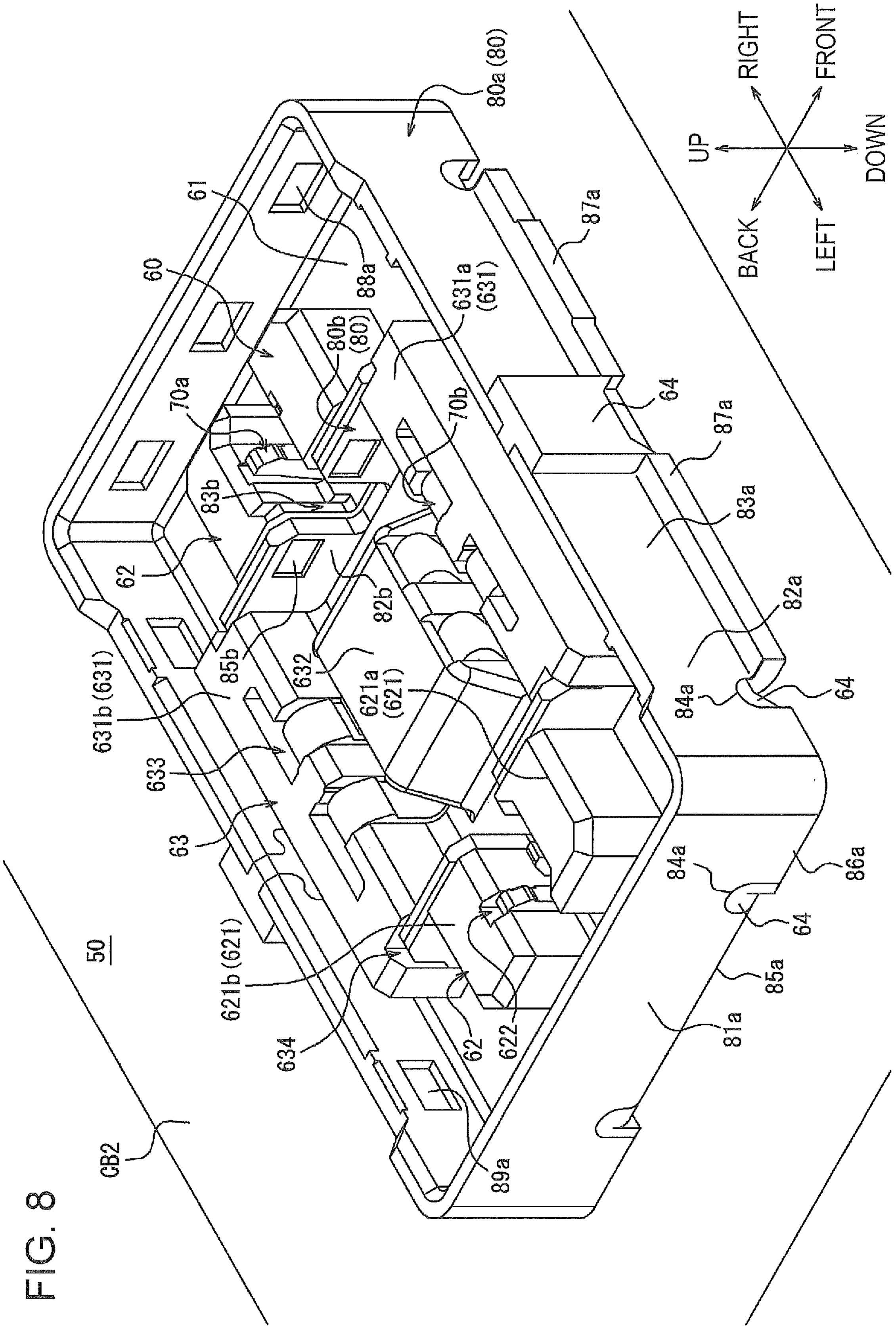
FIG. 8 is an external top perspective view illustrating only the second connector of FIG. 1.
Figure 9:
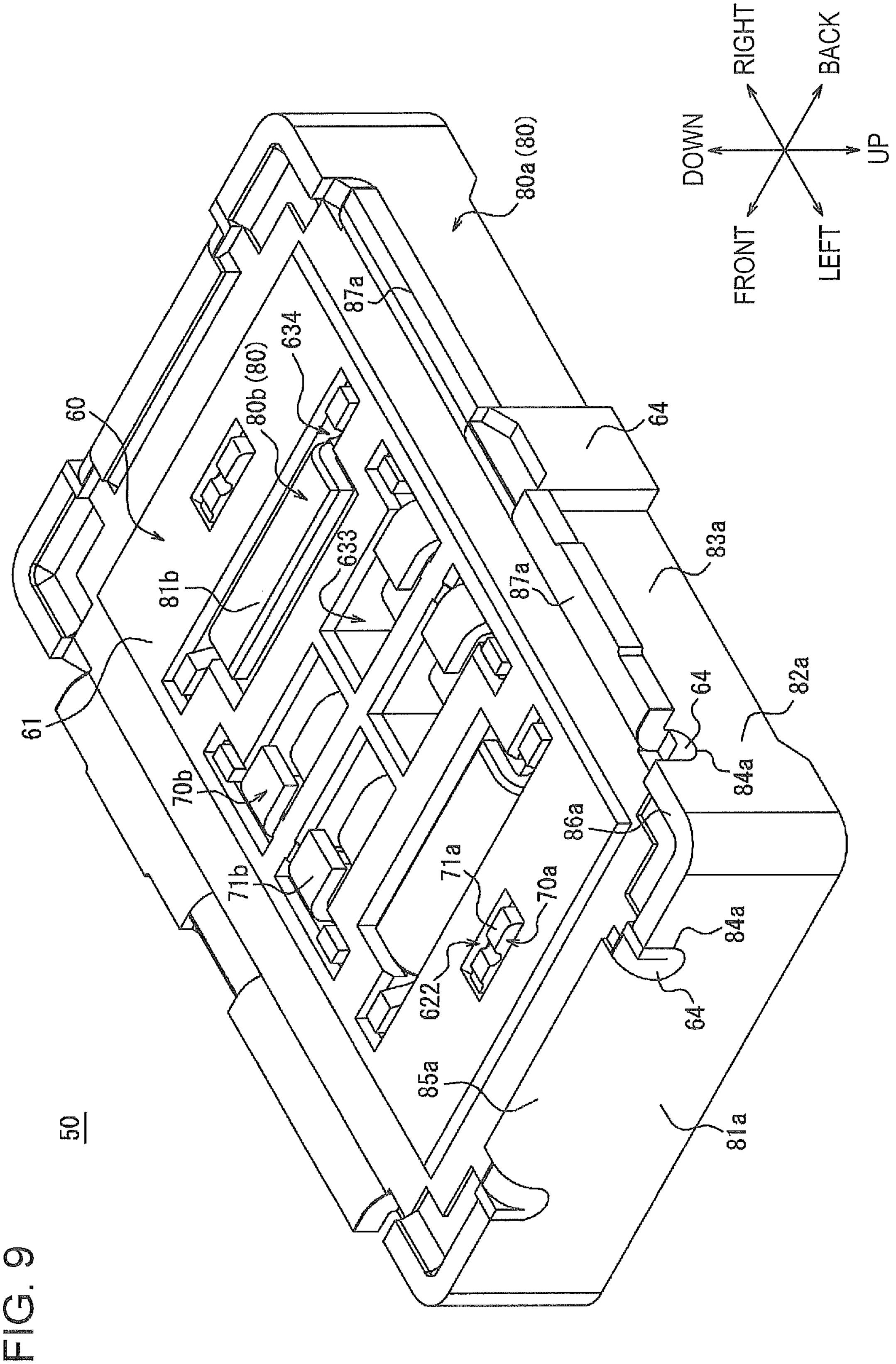
FIG. 9 is an external bottom perspective view illustrating only the second connector of FIG. 1.
Figure 10:
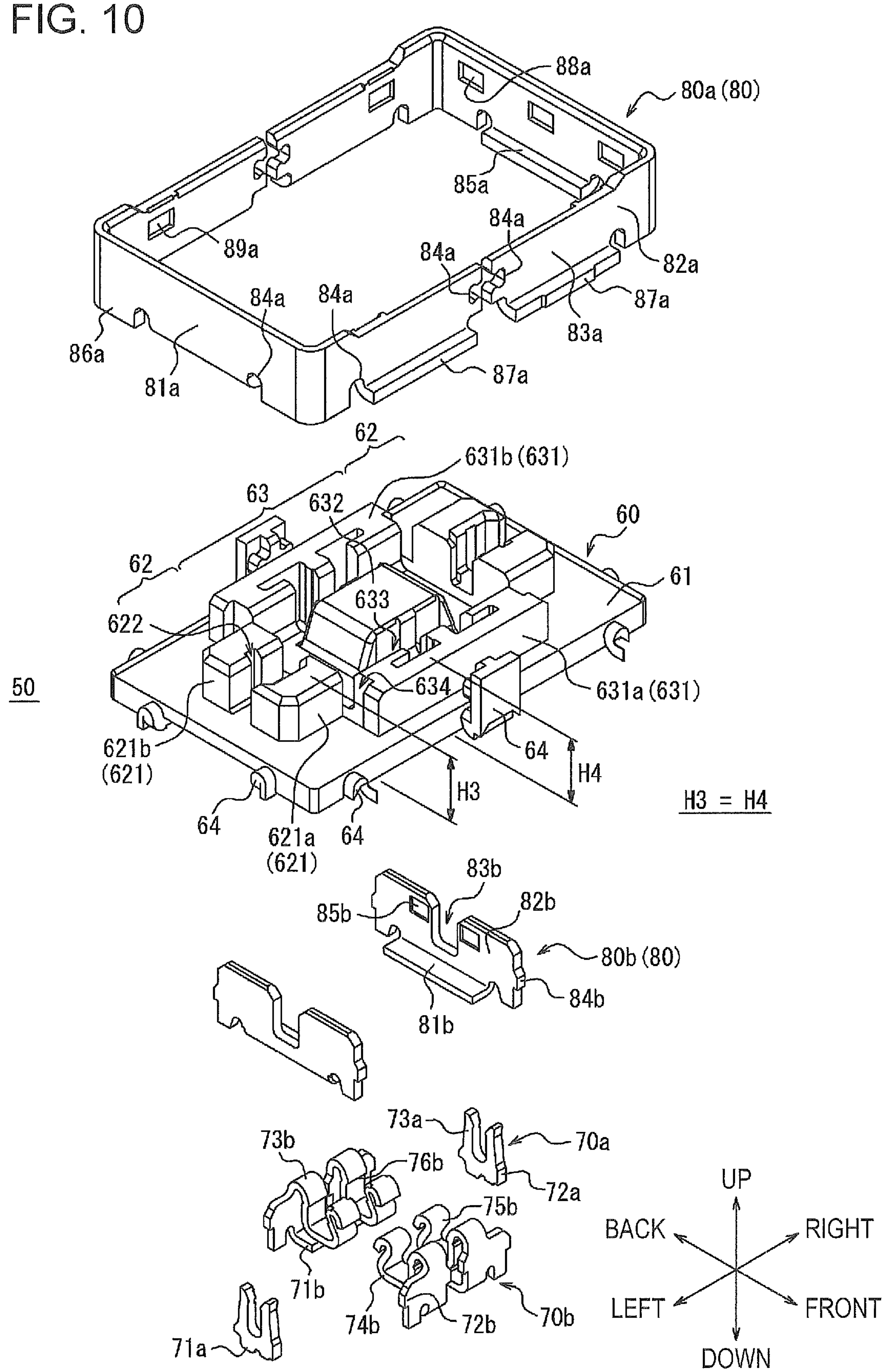
FIG. 10 is an exploded top perspective view illustrating the second connector of FIG. 8.
Figure 11:
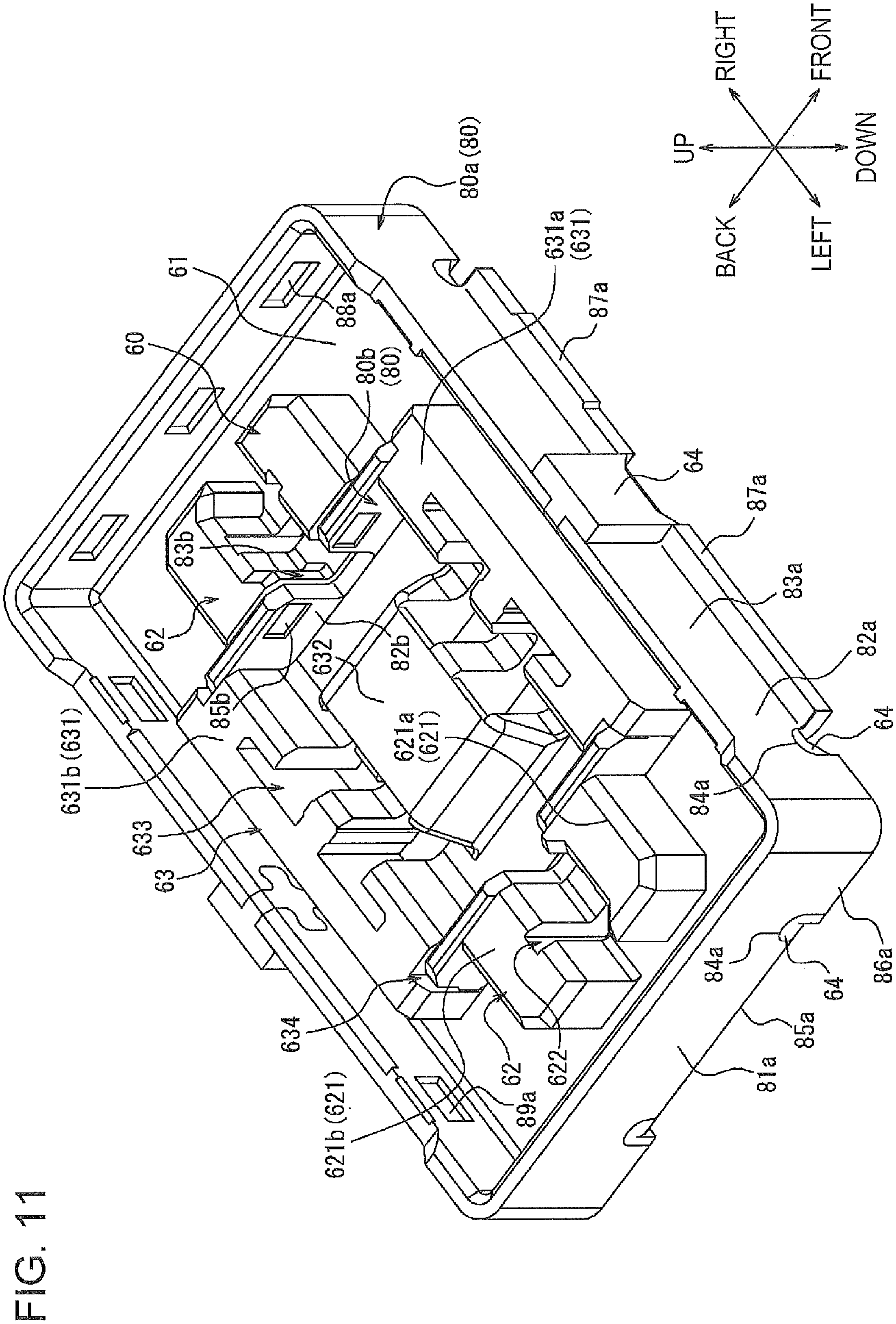
FIG. 11 is an external top perspective view illustrating only a second insulator and a second shield member of the second connector of FIG. 8.

FIG. 8 is an external top perspective view illustrating only the second connector 50 of FIG. 1. FIG. 9 is a bottom perspective view illustrating only the second connector 50 of FIG. 1. FIG. 10 is an exploded top perspective view illustrating the second connector 50 of FIG. 8. FIG. 11 is an external top perspective view illustrating only the second insulator 60 and the second shield member 80 of the second connector 50 of FIG. 8.

The second connector 50 is assembled, for example, by using the following method. The third contact 70*a* is press-fitted into the second insulator 60 from below. The fourth contact 70*b* is press-fitted into the second insulator 60 from below. The second shield member 80 is press-fitted into the second insulator 60 from above and below.

As illustrated in FIGS. 8 and 10, the second insulator 60 is a plate-shaped member that is formed by injection-molding an insulating and heat-resistant synthetic resin material and that extends in the left-right direction. The second insulator 60 includes a bottom plate portion 61 that forms a lower part thereof. The second insulator 60 includes, as large components that protrude upward from the bottom plate portion 61, a third attachment portion 62 to which the third contact 70*a* is attached and a fourth attachment portion 63 that is formed continuously with the third attachment portion 62 and to which the fourth contact 70*b* is attached. The third attachment portion 62 is formed continuously with the fourth attachment portion 63 along the left-right direction so as to be positioned at an outer end in the left-right direction. In the second insulator 60, a pair of the third attachment portions 62 are respectively disposed on the left side and the right side of the fourth attachment portion 63, and the pair of third attachment portions 62 and the fourth attachment portion 63 are integrally formed.

The third attachment portion 62 extends outward in the left-right direction with a constant front-back width from an end part of the fourth attachment portion 63 in the left-right direction. The third attachment portion 62 includes a pair of third wall portions 621 that protrude upward from an upper surface of the bottom plate portion 61 and that are separated from each other in the front-back direction. The third contact 70*a* is attached to the third wall portions 621. The third wall portions 621 are each formed linearly from one end part of the third attachment portion 62 on the fourth attachment portion 63 side to the other end part on the opposite side in the left-right direction in a state in which the third contact 70*a* is interposed in the front-back direction. The third wall portions 621 include a front wall 621*a* that is positioned on the front side and a back wall 621*b* that is positioned on the back side. The height of the third wall portion 621 with respect to the circuit board CB2, on which the second connector 50 is mounted, is the same as the height of a fourth wall portion 631 (described below) with respect to the circuit board CB2. For example, the height H3 of the third wall portion 621 illustrated in FIG. 10 is the same as the height H4 of the fourth wall portion 631. The position of the third wall portion 621 in the front-back direction is the same as the position of a central part of the fourth attachment portion 63 in the front-back direction.

The third attachment portion 62 has a third-contact holding groove 622 that is formed in a back surface of the front wall 621*a*, the bottom plate portion 61, and a front surface of the back wall 621*b*. The third-contact holding groove 622 holds the third contact 70*a* because the third contact 70*a* is press-fitted thereinto.

The fourth attachment portion 63 includes a pair of the fourth wall portions 631 that protrude upward from the upper surface of the bottom plate portion 61 and that are separated from each other in the front-back direction. The fourth wall portion 631 is separated from the third wall portion 621 of the third attachment portion 62. The fourth contact 70*b* is attached to the fourth wall portion 631. The fourth wall portions 631 include a front wall 631*a* that is positioned on the front side and a back wall 631*b* that is positioned on the back side. The height of the fourth wall portion 631 with respect to the circuit board CB2, on which the second connector 50 is mounted, is the same as the height of the third wall portion 621 with respect to the circuit board CB2.

The fourth attachment portion 63 includes a fitting raised portion 632 that protrudes upward from a central part of the bottom plate portion 61. The fourth attachment portion 63 has a fourth-contact holding groove 633 that is formed in an inner surface in the front-back direction of the fourth wall portion 631, the bottom plate portion 61, and an outer surface in the front-back direction of the fitting raised portion 632. The fourth-contact holding groove 633 holds the fourth contact 70*b* because the fourth contact 70*b* is press-fitted thereinto.

The second insulator 60 includes a second-shield-member holding portion 64 that protrudes from each of positions on the front, back, left, and right side surfaces of the bottom plate portion 61. As illustrated also in FIGS. 8 and 9, the fourth attachment portion 63 has a second-shield-member holding groove 634 that is formed in an end part of the fourth attachment portion 63 on the third attachment portion 62 side and that extends in the front-back direction. The second-shield-member holding portion 64 and the second-shield-member holding groove 634 hold the second shield member 80 because the second shield member 80 is press-fitted thereinto.

Figure 12:
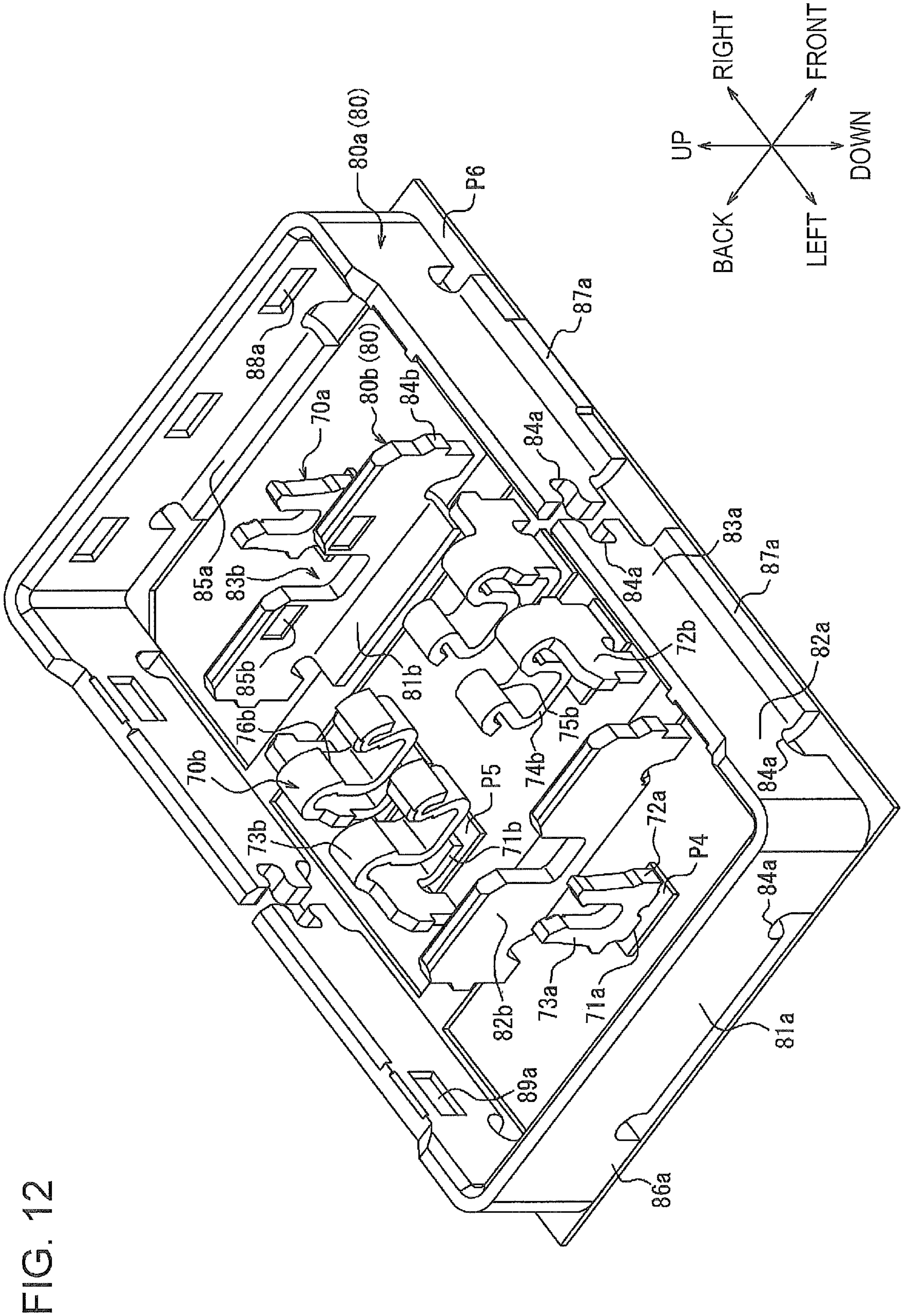
FIG. 12 is a top perspective view illustrating the second connector of FIG. 8 in a state in which only the second insulator is not illustrated.
Figure 13:
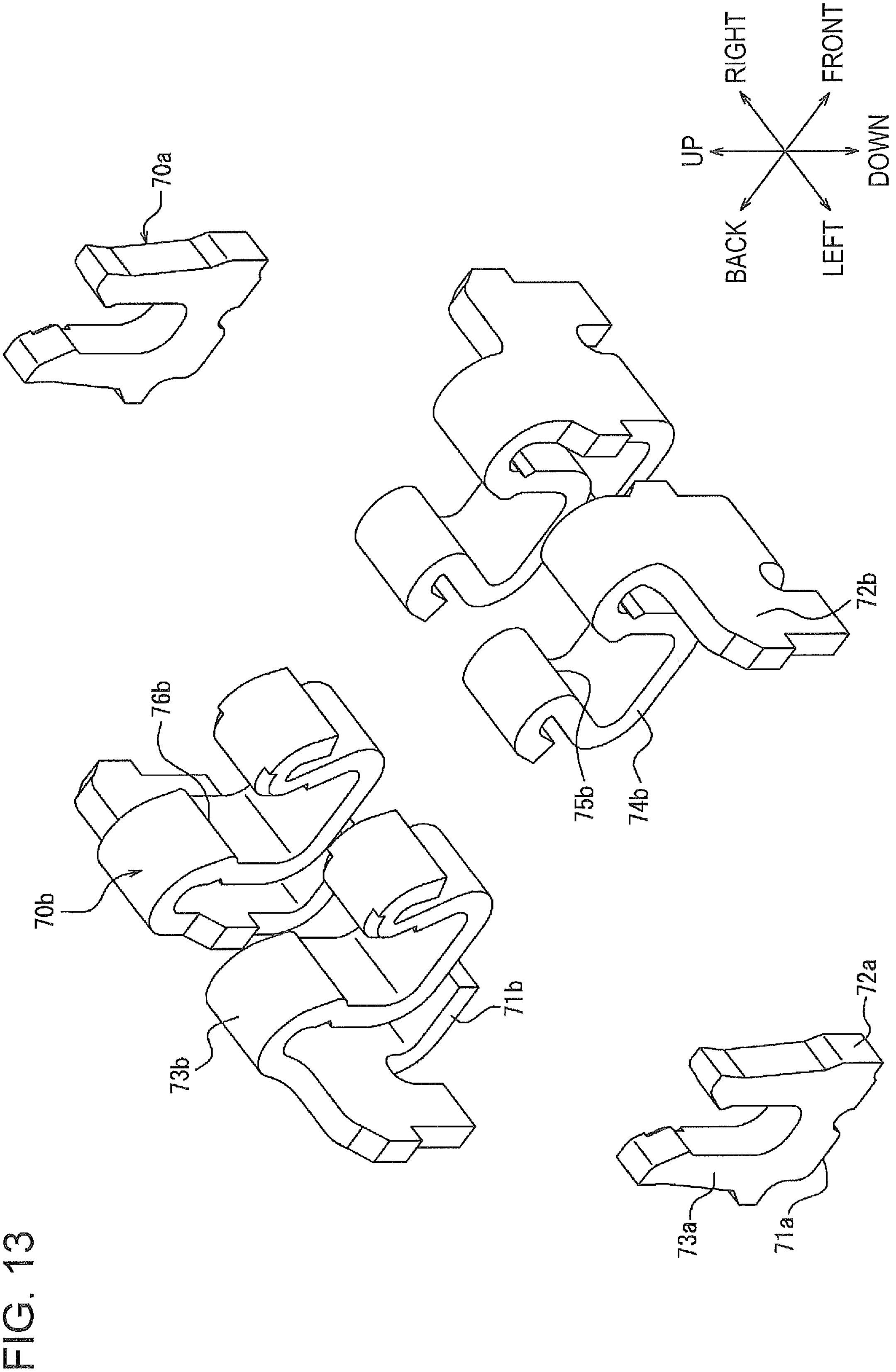
FIG. 13 is a top perspective view illustrating only a third contact and a fourth contact of FIG. 12.

FIG. 12 is a top perspective view illustrating the second connector 50 of FIG. 8 in a state in which only the second insulator 60 is not illustrated. FIG. 12 illustrates an example of a mount pattern of the circuit board CB2 on which the second connector 50 is mounted, in addition to the third contact 70*a*, the fourth contact 70*b*, and the second shield member 80 of the second connector 50. FIG. 13 is a top perspective view illustrating only the third contact 70*a* and the fourth contact 70*b* of FIG. 12. Referring mainly to FIGS. 10, 12, and 13, the configuration of each of the third contact 70*a* and the fourth contact 70*b* will be described in detail.

The third contact 70*a* is made by, for example, forming a thin plate of: a copper alloy, including phosphor bronze, beryllium copper, or titanium copper; or a Corson copper alloy into the shape illustrated in the figures by using a progressive die (stamping). The surface of the third contact 70*a* is plated by gold, tin, or the like after forming a sublayer by nickel plating. The third contact 70*a* is generally U-shaped. For example, the third contact 70*a* includes a contact that is used to transmit an RF signal.

The third contact 70*a* includes a mount portion 71*a* that extends linearly downward from a lower end part thereof. The third contact 70*a* includes a latch portion 72*a* that is formed continuously with an upper end part of the mount portion 71*a* and that is wide in the front-back direction. The third contact 70*a* includes a pair of elastic contacting portions 73*a* that respectively extend upward from the front and back ends of the latch portion 72*a*. The elastic contacting portion 73*a* has spring elasticity so as to be capable of elastically deforming along the front-back direction.

As illustrated also in FIGS. 8 and 9, the third contact 70*a* is held with respect to the third-contact holding groove 622, because the latch portion 72*a* is latched to the third-contact holding groove 622. The third contact 70*a* is disposed so as to be interposed between the front wall 621*a* and the back wall 621*b* of the third attachment portion 62 in the front-back direction. When the third contact 70*a* is held in the third-contact holding groove 622 of the second insulator 60, the mount portion 71*a* of the third contact 70*a* is exposed downward from the bottom plate portion 61.

The fourth contact 70*b* is made by, for example, forming a thin plate of: a copper alloy, including phosphor bronze, beryllium copper, or titanium copper; or a Corson copper alloy into the shape illustrated in the figures by using a progressive die (stamping). The surface of the fourth contact 70*b* is plated by gold, tin, or the like after forming a sublayer by nickel plating. For example, the fourth contact 70*b* includes a contact that is used to transmit a signal other than an RF signal.

As illustrated in FIG. 13, the fourth contact 70*b* includes a mount portion 71*b* that extends inward in the front-back direction in an L-shape. The fourth contact 70*b* includes a latch portion 72*b* that is formed continuously upward from an upper end part of the mount portion 71*b*. The latch portion 72*b* is formed wider in the left-right direction than the mount portion 71*b* and a curved portion 73*b* described below. The fourth contact 70*b* includes the curved portion 73*b* that extends upward from the latch portion 72*b* in a U-shape, an elastic contacting portion 74*b* that is S-shaped and that is continuous with the curved portion 73*b*, and a contacting portion 75*b* that is formed at a tip part of the elastic contacting portion 74*b* so as to face outward in the front-back direction. The fourth contact 70*b* includes a contacting portion 76*b* including a projection that projects from an inner surface, in the front-back direction, of the curved portion 73*b*.

As illustrated also in FIGS. 8 and 9, the fourth contact 70*b* is held with respect to the fourth-contact holding groove 633, because the latch portion 72*b* is latched to the fourth-contact holding groove 633. When the fourth contact 70*b* is held in the fourth-contact holding groove 633 of the second insulator 60, the elastic contacting portion 74*b* can elastically deform in the front-back direction in the fourth-contact holding groove 633 formed in the fitting raised portion 632. When the fourth contact 70*b* is held in the fourth-contact holding groove 633 of the second insulator 60, the mount portion 71*b* of the fourth contact 70*b* is exposed downward from the bottom plate portion 61.

Figure 14:
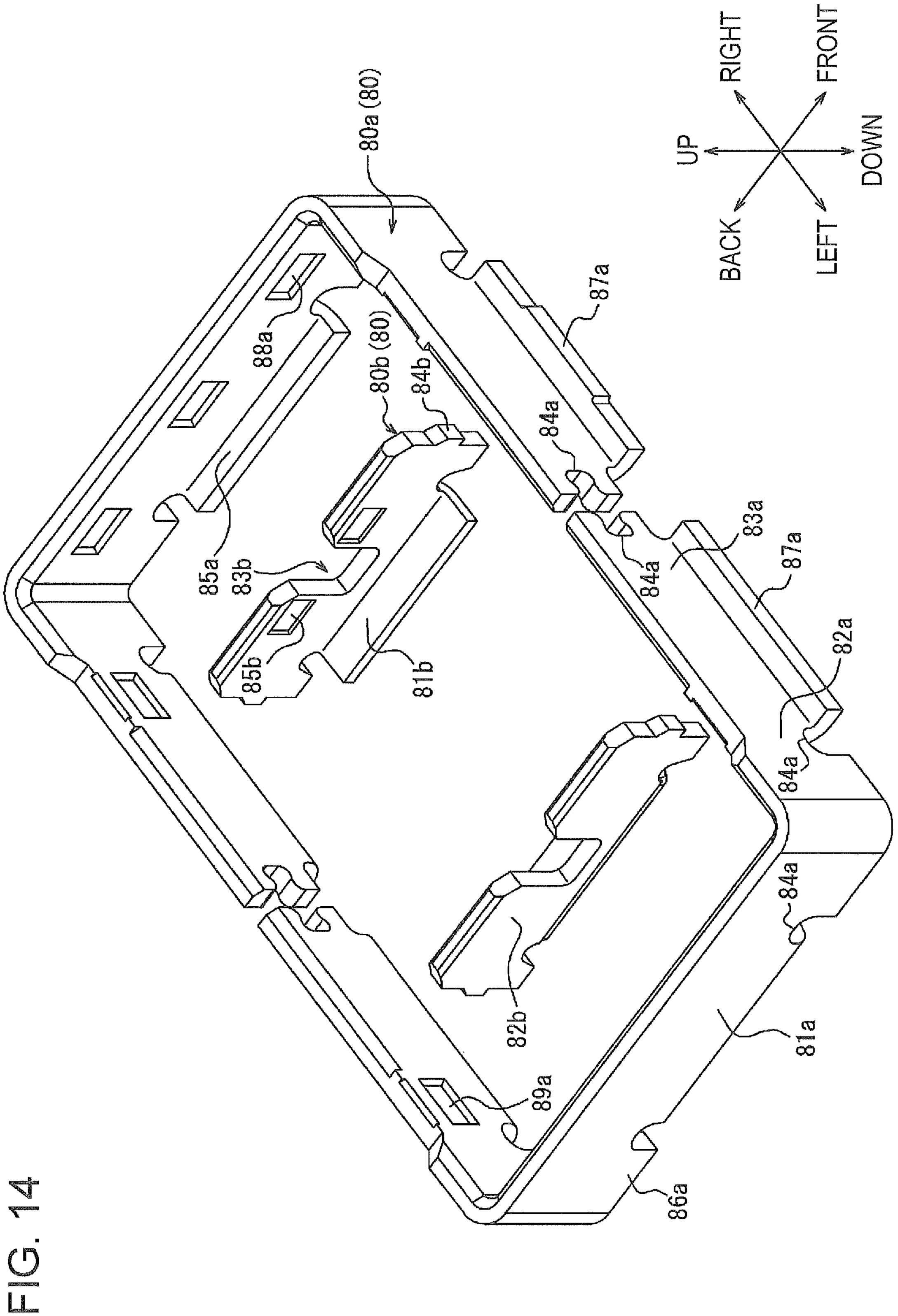
FIG. 14 is a top perspective view illustrating only the second shield member of FIG. 12.

FIG. 14 is a top perspective view illustrating only the second shield member 80 of FIG. 12. Referring mainly to FIGS. 12 and 14, the configuration of the second shield member 80 will be described in detail.

The second shield member 80 is made by forming a thin plate of any appropriate metal material into the shape illustrated in FIGS. 12 and 14 by using a progressive die (stamping). The method of forming the second shield member 80 includes a step of bending the thin plate in the plate-thickness direction after punching the thin plate.

The second shield member 80 includes, for example, four members. To be more specific, as illustrated also in FIGS. 8 to 10, the second shield member 80 includes a pair of first members 80*a* that are attached to the second insulator 60 from above so as to surround the second insulator 60, the third contact 70*a*, and the fourth contact 70*b* from four directions. The second shield member 80 includes a pair of second members 80*b* that are attached to the second insulator 60 from below so as to be disposed respectively at the left and right end parts of the fourth attachment portion 63 of the second insulator 60.

As illustrated also in FIGS. 8 and 9, the first member 80*a* is held by the second insulator 60 because the first member 80*a* is press-fitted into the second-shield-member holding portion 64 of the second insulator 60. The second member 80*b* is held by the second insulator 60 because the second member 80*b* is press-fitted into the second-shield-member holding groove 634 of the fourth attachment portion 63.

As illustrated in FIGS. 12 and 14, the second member 80*b* includes a mount portion 81*b* that extends inward in the left-right direction in an L-shape. The second member 80*b* includes a fourth shield portion 82*b* that extends upward from an upper end part of the mount portion 81*b*. As illustrated also in FIGS. 8 and 9, the fourth shield portion

82*b* is disposed at an end part of the fourth attachment portion 63 on the third attachment portion 62 side and extends in the front-back direction so as to overlap the third contact 70*a*. The fourth shield portion 82*b* is disposed inside of the third contact 70*a* in the left-right direction and extends in the front-back direction so as to overlap the third contact 70*a* along the left-right direction.

The second member 80*b* includes a cutout portion 83*b* that is cut out from above at a central part of the fourth shield portion 82*b* in the front-back direction. The second member 80*b* includes a latch portion 84*b* that protrudes outward in the front back direction from each of the front and back side surfaces of the fourth shield portion 82*b*. As illustrated also in FIGS. 8 and 9, the second member 80*b* is held with respect to the second-shield-member holding groove 634, because the latch portion 84*b* is latched to the second-shield-member holding groove 634. As illustrated also in FIG. 9, when the second member 80*b* is held in the second-shield-member holding groove 634 of the second insulator 60, the mount portion 81*b* of the second member 80*b* is exposed downward from the bottom plate portion 61.

The fourth shield portion 82*b* of the second member 80*b* includes a pair of contacting portions 85*b* that are recessed, on the front and back sides, in an inner surface in the left-right direction of the fourth shield portion 82*b*. The pair of contacting portions 85*b* are disposed so that the cutout portion 83*b* is interposed therebetween from the front and back sides.

As illustrated in FIGS. 12 and 14, the first member 80*a* includes a fifth shield portion 81*a* that forms an end part thereof in the left-right direction and extends in the front-back direction. The fifth shield portion 81*a* is disposed on a side opposite to the fourth shield portion 82*b* with respect to the third contact 70*a*, and extends in the front-back direction so as to overlap the third contact 70*a*. The fifth shield portion 81*a* is disposed outside of the third contact 70*a* in the left-right direction and extends in the front-back direction so as to overlap the third contact 70*a* along the left-right direction.

The first member 80*a* includes a sixth shield portion 82*a* that forms an end part thereof in the front-back direction and extends in the left-right direction with a predetermined width. The sixth shield portion 82*a* is disposed on each of two sides in the front-back direction with respect to the third contact 70*a* so as to overlap the third contact 70*a*. The sixth shield portion 82*a* extends in the left-right direction so as to overlap the third contact 70*a* along the front-back direction.

The first member 80*a* includes an outer-peripheral-side shield portion 83*a* that is disposed outside of the second insulator 60 along the left-right direction so as to overlap the fourth contact 70*b*. The outer-peripheral-side shield portion 83*a* extends in the left-right direction so as to overlap the fourth contact 70*b* along the front-back direction and to be coupled to the sixth shield portions 82*a* that is positioned at an end part in the left and right direction.

As illustrated in FIG. 12, the fifth shield portion 81*a*, the sixth shield portion 82*a*, and the outer-peripheral-side shield portion 83*a* of the first member 80*a* are integrally formed in an angular-U shape. A pair of the first members 80*a* surround all of the third contacts 70*a* and the fourth contacts 70*b* from the outside.

The first member 80*a* includes a latch portion 84*a* that is recessed at each of positions in the fifth shield portion 81*a*, the sixth shield portion 82*a*, and the outer-peripheral-side shield portion 83*a*. The first member 80*a* includes a first mount portion 85*a* that extends inward in the left-right direction from a lower end part of the fifth shield portion 81*a* in an L-shape and that extends in the front-back direction. The first member 80*a* includes a second mount portion 86*a* that extends linearly downward at two corners of the first member 80*a*. The first member 80*a* includes a third mount portion 87*a* that extends from a lower end part of the sixth shield portion 82*a* and the outer-peripheral-side shield portion 83*a* outward in the front-back direction in an L-shape and that extends in the left-right direction.

As illustrated also in FIGS. 8 and 9, the first member 80*a* is held by the second insulator 60 because the latch portion 84*a* is latched to the second-shield-member holding portion 64 of the second insulator 60. As illustrated also in FIG. 9, when the first member 80*a* is held by the second insulator 60, the first mount portion 85*a*, the second mount portion 86*a*, and the third mount portion 87*a* of the first member 80*a* are positioned below the lower surface of the second insulator 60.

The fifth shield portion 81*a* of the first member 80*a* includes three first contacting portions 88*a* that are recessed in the inner surface, in the left-right direction, of the fifth shield portion 81*a*. The sixth shield portion 82*a* of the first member 80*a* includes one second contacting portion 89*a* that is recessed in the inner surface, in the front-back direction, of the sixth shield portion 82*a*.

With the second connector 50 having the structure described above, the mount portion 71*a* of the third contact 70*a* is soldered to a circuit pattern formed on the mount surface of the circuit board CB2. The mount portion 71*b* of the fourth contact 70*b* is soldered to a circuit pattern formed on the mount surface. The first mount portion 85*a*, the second mount portion 86*a*, and the third mount portion 87*a* of the first member 80*a* of the first member 80*a*; and the mount portion 81*b* of the second member 80*b* are soldered to a ground pattern formed on the mount surface.

For example, as illustrated in FIG. 12, each of the mount portions 71*a* of the pair of third contacts 70*a* is soldered to one independent circuit pattern P4. For example, each of the mount portions 71*b* of the four fourth contacts 70*b* is soldered to one independent circuit pattern P5. For example, the first mount portion 85*a*, the second mount portion 86*a*, and the third mount portion 87*a* of the first member 80*a*; and the mount portion 81*b* of the second member 80*b* are soldered to one ground pattern P6 that is integrally formed. Thus, it is possible to regard the two first members 80*a* and the two second members 80*b* electrically as one shield member. In the way described above, the second connector 50 is mounted on the circuit board CB2. For example, electronic components other than the second connector 50, such as a central processing unit (CPU), a controller, and a memory, are mounted on the mount surface of the circuit board CB2.

Referring to FIGS. 15 to 18, the configuration of the connector 1 in a fitted state in which the first connector 10 and the second connector 50 are connected to each other and the first insulator 20 and the second insulator 60 are fitted to each other will mainly be described.

For example, in a state in which the orientation in the up-down direction of the first connector 10 illustrated in FIG. 3 is inverted, the first connector 10 and the second connector 50 are caused to face each other in the up-down direction while causing the front-back positions and the left-right positions thereof to approximately coincide with each other. The first connector 10 is moved downward. Thus, the first connector 10 and the second connector 50 are connected to each other, and the connected state of the connector 1 can be obtained. At this time, the fitting recess

223 of the first insulator 20 and the fitting raised portion 632 of the second insulator 60 are fitted to each other.

Figure 15:
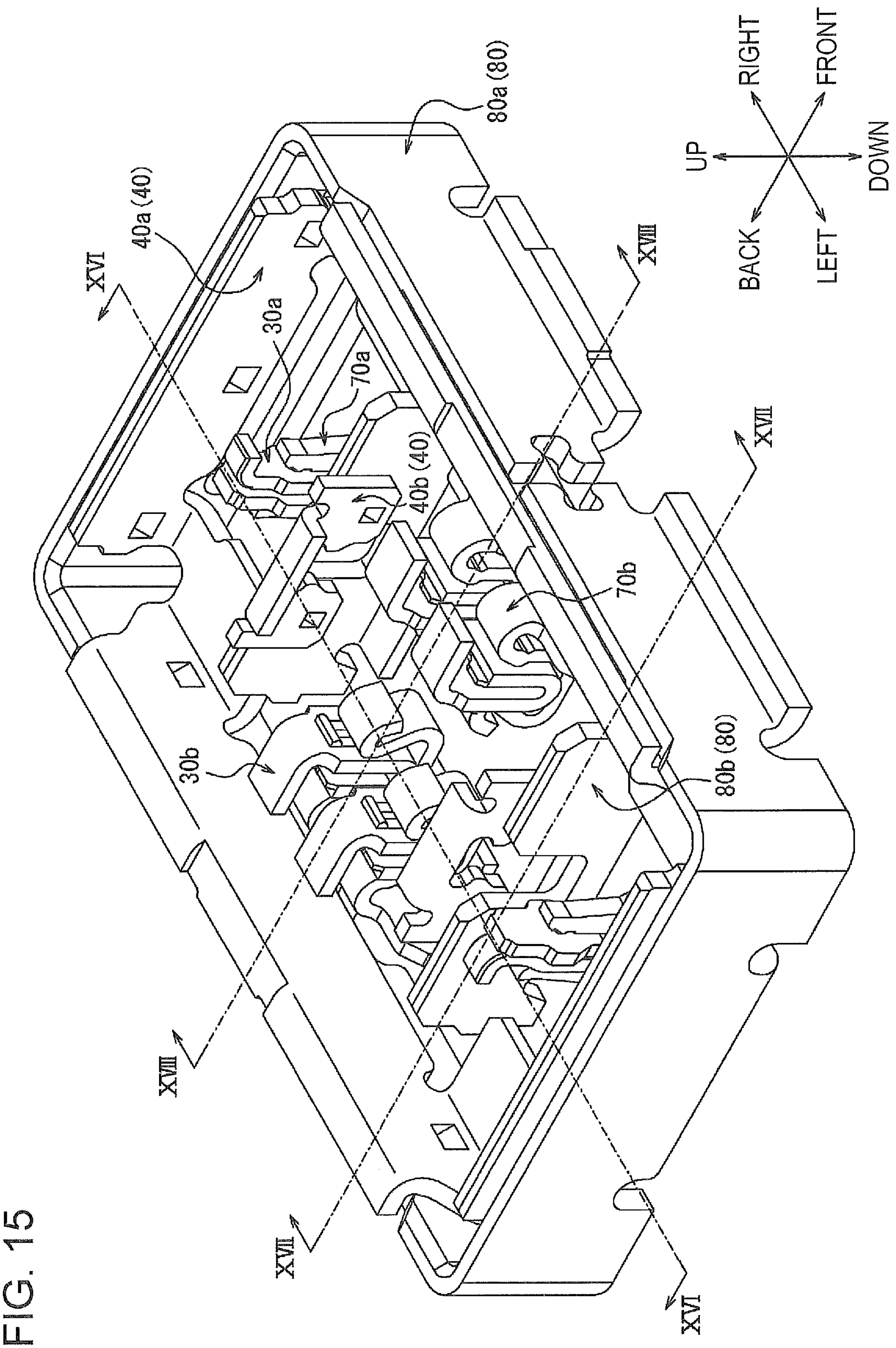
FIG. 15 is a top perspective view illustrating the connector of FIG. 1 in a state in which only the first insulator and the second insulator are not illustrated.
Figure 16:
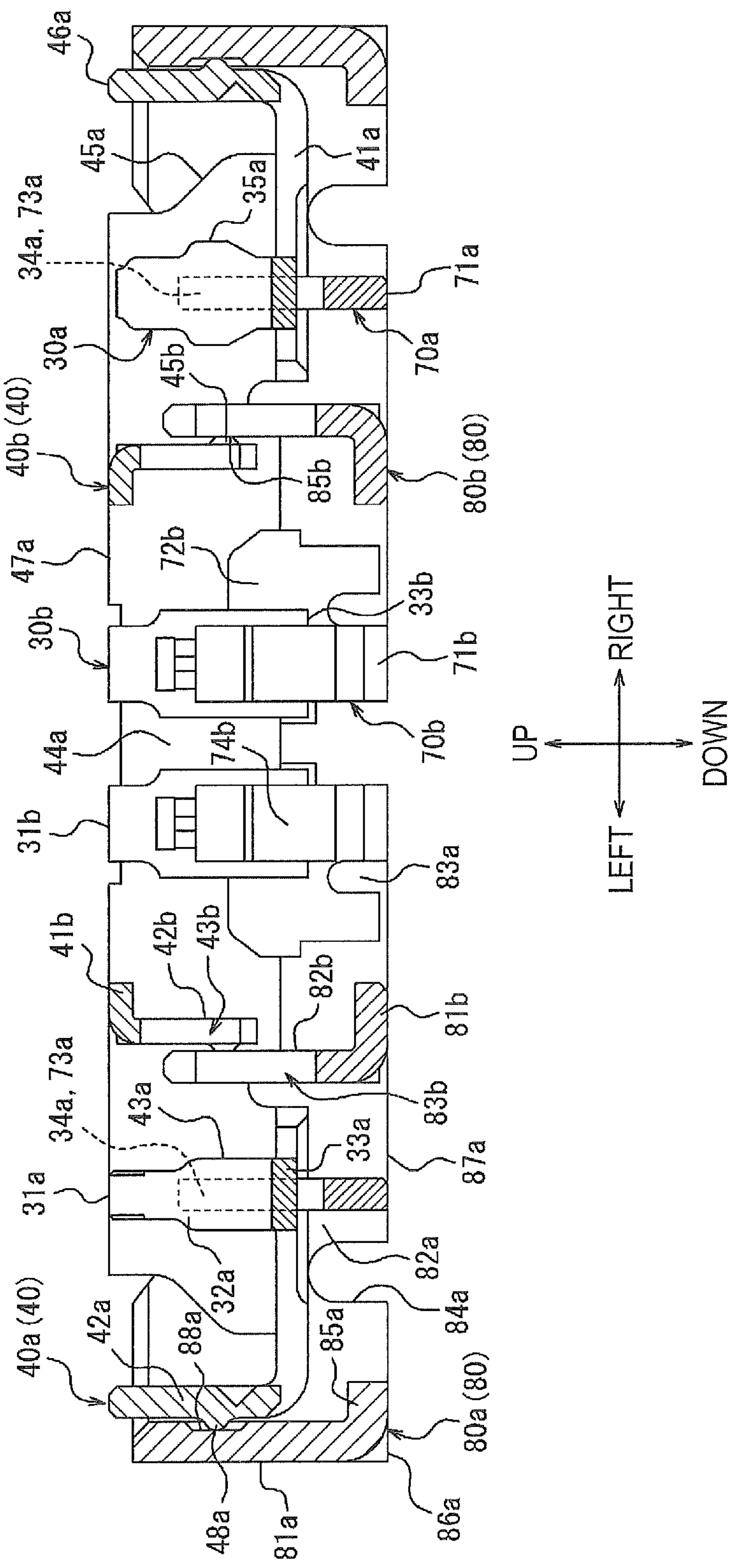
FIG. 16 is a sectional view taken along an arrow XVI-XVI of FIG. 15.

FIG. 15 is a top perspective view illustrating the connector 1 of FIG. 1 in a state in which only the first insulator 20 and the second insulator 60 are not illustrated. FIG. 16 is a sectional view taken along an arrow XVI-XVI of FIG. 15.

As illustrated in FIG. 16, in the fitted state, the first shield portion 42*b* of the second member 40*b* of the first shield member 40 and the fourth shield portion 82*b* of the second member 80*b* of the second shield member 80 are in contact with each other. To be more specific, the contacting portion 45*b*, which protrudes from the first shield portion 42*b*, is engaged with the contacting portion 85*b* that is recessed in the fourth shield portion 82*b*.

Likewise, in the fitted state, the second shield portion 42*a* of the first member 40*a* of the first shield member 40 and the fifth shield portion 81*a* of the first member 80*a* of the second shield member 80 are in contact with each other. To be more specific, the first contacting portion 48*a*, which protrudes from the second shield portion 42*a*, is engaged with the first contacting portion 88*a* that is recessed in the fifth shield portion 81*a*.

In the fitted state, the first shield portion 42*b* and the fourth shield portion 82*b*, which are in contact with each other, are disposed inside, in the left-right direction, of the contacting portion 34*a* and the elastic contacting portion 73*a*, which are in contact with each other. The second shield portion 42*a* and the fifth shield portion 81*a*, which are in contact with each other, are disposed outside, in the left-right direction, of the contacting portion 34*a* and the elastic contacting portion 73*a*, which are in contact with each other. As described above, the contacting portion 34*a* and the elastic contacting portion 73*a*, which are in contact with each other, are shielded by the first shield portion 42*b* and the fourth shield portion 82*b* and the second shield portion 42*a* and the fifth shield portion 81*a* from both sides in the left-right direction. In this way, the contacting portion 34*a* and the elastic contacting portion 73*a*, which are in contact with each other, are shielded on each of two sides in the left-right direction by the double structure of the shield portion.

Figure 17:
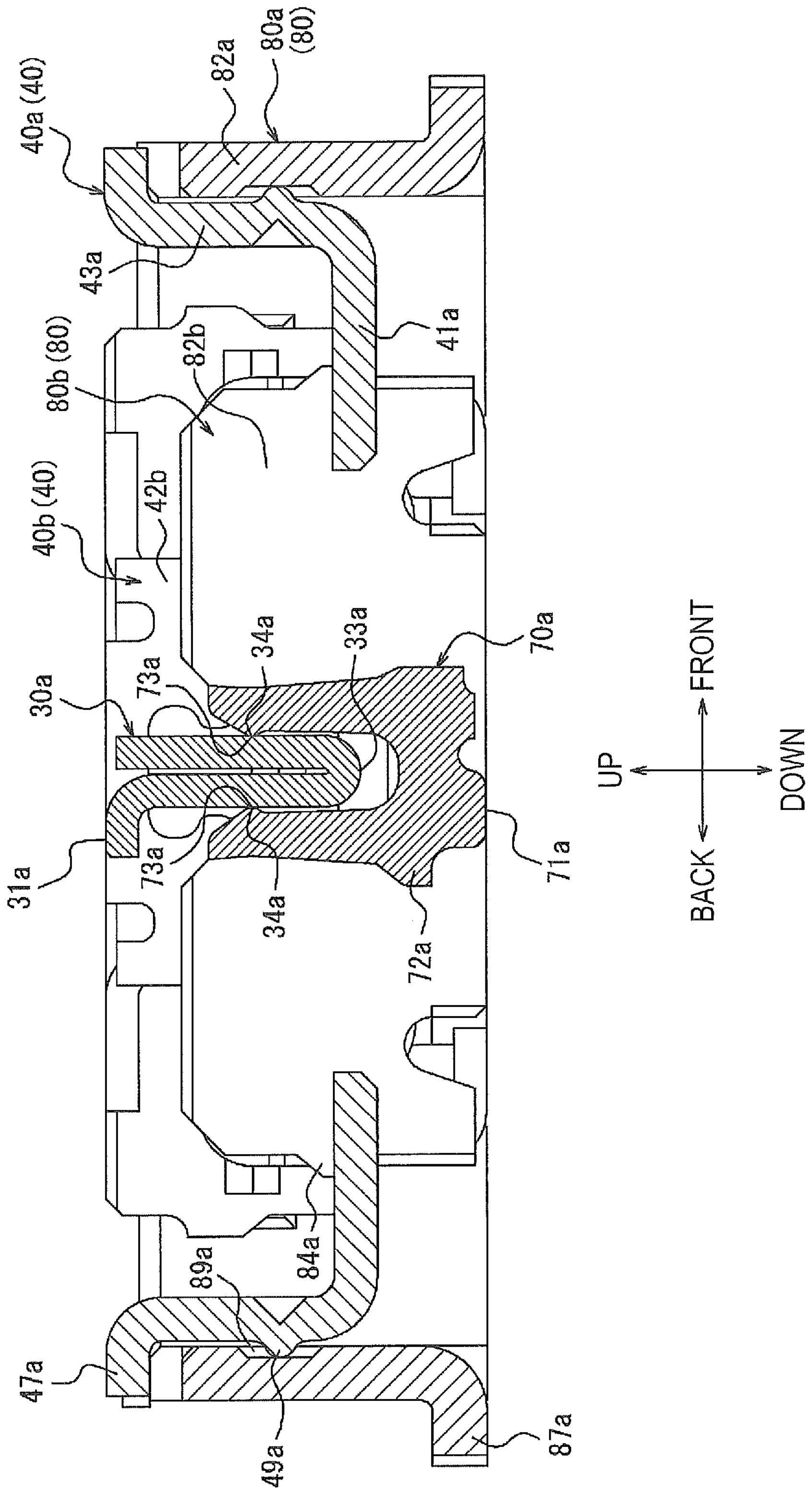
FIG. 17 is a sectional view taken along an arrow XVII-XVII of FIG. 15.

FIG. 17 is a sectional view taken along an arrow XVII-XVII of FIG. 15.

As illustrated in FIG. 17, in the fitted state, the contacting portion 34*a* of the first contact 30*a* and the elastic contacting portion 73*a* of the third contact 70*a* are in contact with each other, and the elastic contacting portion 73*a*, which has spring elasticity, is elastically deformed outward in the front-back direction. The first contact 30*a* and the third contact 70*a* are in contact with each other at two points on the front and back sides due to the contacting portions 34*a* and the elastic contacting portions 73*a*.

In the fitted state, the third shield portion 43*a* of the first member 40*a* of the first shield member 40 and the sixth shield portion 82*a* of the first member 80*a* of the second shield member 80 are in contact with each other. To be more specific, the second contacting portion 49*a*, which protrudes from the third shield portion 43*a*, is engaged with the second contacting portion 89*a* that is recessed in the sixth shield portion 82*a*.

In the fitted state, the third shield portion 43*a* and the sixth shield portion 82*a*, which are in contact with each other, are disposed on each of two sides in the front-back direction of the contacting portion 34*a* and the elastic contacting portion 73*a*, which are in contact with each other. In this way, the contacting portion 34*a* and the elastic contacting portion 73*a*, which are in contact with each other, are shielded by the third shield portion 43*a* and the sixth shield portion 82*a* from each of two sides in the front-back direction. The contacting portion 34*a* and the elastic contacting portion 73*a*, which are in contact with each other, are shielded on each of two sides in the left-right direction by the double structure of the shield portion.

Figure 18:
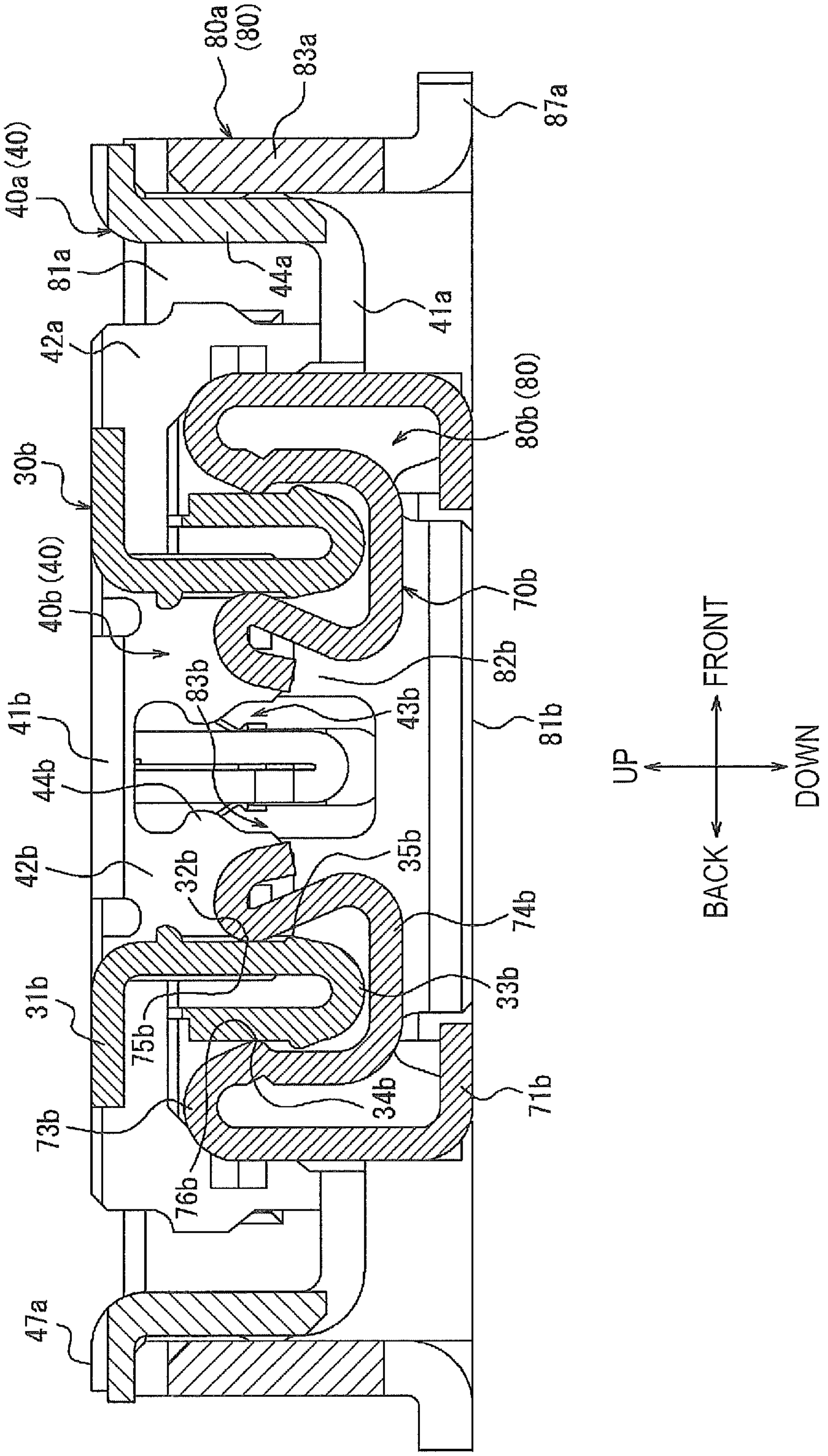
FIG. 18 is a sectional view taken along an arrow XVIII-XVIII of FIG. 15.

FIG. 18 is a sectional view taken along an arrow XVIII-XVIII of FIG. 15.

As illustrated in FIG. 18, in the fitted state, the projection 35*b* of the second contact 30*b* has moved over the contacting portion 75*b* of the fourth contact 70*b* while moving downward, and the contacting portion 32*b* of the second contact 30*b* and the contacting portion 75*b* of the fourth contact 70*b* are in contact with each other. At this time, the elastic contacting portion 74*b*, which has spring elasticity, is elastically deformed inward in the front-back direction. Likewise, the contacting portion 34*b* of the second contact 30*b* and the contacting portion 76*b* of the fourth contact 70*b* are in contact with each other. The second contact 30*b* and the fourth contact 70*b* are in contact with each other at two points due to the contacting portion 32*b* and the contacting portion 75*b* and due to the contacting portion 34*b* and the contacting portion 76*b*.

In the fitted state, the outer-peripheral-side shield portion 44*a* of the first member 40*a* of the first shield member 40 and the outer-peripheral-side shield portion 83*a* of the first member 80*a* of the second shield member 80 overlap each other in the front-back direction. To be more specific, the outer-peripheral-side shield portion 44*a* is disposed inside of the outer-peripheral-side shield portion 83*a* in the front-back direction so as to be parallel to the outer-peripheral-side shield portion 83*a* along the left-right direction.

In the fitted state, the outer-peripheral-side shield portion 44*a* and the outer-peripheral-side shield portion 83*a*, which overlap each other, are disposed outside in the front-back direction with respect to the contacting portion 32*b* and the contacting portion 75*b*, which are in contact with each other, and with respect to the contacting portion 34*b* and the contacting portion 76*b*, which are in contact with each other. In this way, the two contacting portions of the second contact 30*b* and the fourth contact 70*b* are shielded by the outer-peripheral-side shield portion 44*a* and the outer-peripheral-side shield portion 83*a* from the outside in the front-back direction. The two contacting portions of the second contact 30*b* and the fourth contact 70*b* are shielded by the double structure of the shield portion on the outside in the front-back direction.

With the first connector 10 according to one embodiment of the present disclosure described above, the strength of the first insulator 20, to which the first contact 30*a* and the second contact 30*b* are attached, is improved. For example, the first insulator 20 includes the first attachment portion 21 and the second attachment portion 22, and the first wall portion 213 and the second wall portion 222*b* are respectively provided for the first contact 30*a* and the second contact 30*b*, which are disposed so as to be separated from each other. Thus, the strength of the first insulator 20 is improved. In particular, the strength against a bending moment in the left-right direction is improved. Thus, the strength of the first connector 10 is also improved, and breakage of the first connector 10 when being fitted to the second connector 50 and when fitted to the second connector 50 is suppressed. Accordingly, the reliability of the first connector 10 as a product is improved.

In the first insulator 20, the first wall portion 213, which is provided for the first contact 30*a*, and the second wall portion 222*b*, which is provided for the second contact 30*b*, are separated from each other. Thus, compared with a case where these wall portions are integrally formed, the freedom in design of the wall portions in the first insulator 20 is improved. Accordingly, it is possible to reduce the first insulator 20 in size in accordance with requirement for reduction in weight and size of electronic apparatuses. As a result, it is possible to reduce the first connector 10 in size. In addition, it is possible to optimally dispose the first contact 30*a* and the second contact 30*b* relative to each other in the first connector 10, which is reduced in size, and, at the same time, it is possible to strengthen the first connector 10, which is adapted to reduction in size and height.

Because the first contact 30*a* and the second contact 30*b*, whose types differ from each other, are attached to the first insulator 20, the first connector 10 is connectable to circuits of different types. Accordingly, it is possible for the first connector 10 to have a plurality of functions in accordance with requirement for increased multifunctionality of electronic apparatuses.

The height H1 of the first wall portion 213 with respect to the circuit board CB1, on which the first connector 10 is mounted, is the same as the height H2 of the second wall portion 222*b* with respect to the circuit board CB1. Thus, for example, the strength of the first attachment portion 21 is improved, compared with a case where the first wall portion 213 is formed as a rib that is lower than the second wall portion 222*b*. Accordingly, the strength of the first insulator 20 and the strength as the first connector 10 are also improved. Even when a bending moment in the left-right direction of the first connector 10 and a twisting force to the main surface of the first connector 10 are applied, because the connection portion between the first attachment portion 21 and the second attachment portion 22 is flat, the connection portion is not likely to become a starting point of breakage due to a notch effect.

Because the first wall portion 213 is formed linearly from one end part of the first attachment portion 21 on the second attachment portion 22 side to the other end part on the opposite side in the left-right direction in a state in which the first contact 30*a* is interposed in the left-right direction, the strength of the first wall portion 213 is improved. Accordingly, the strength of the first insulator 20 and the strength as the first connector 10 are also improved.

Because the first shield member 40 includes the first shield portion 42*b*, the noise shielding effect is improved. In recent years, the frequency of signals in electronic apparatuses have rapidly increased due to increase in information amount or increase in communication speed, and measures against noise in the apparatuses have become important. On the other hand, electronic apparatuses have been reduced in size in recent years, and reduction in size, such as reduction in height, is required also for connectors mounted in electronic apparatuses. Thus, it is required for connectors that have been reduced in size to have a sufficient noise blocking effect while having a sufficient strength of connector terminals. It is also possible for the first connector 10 according to one embodiment to fulfill such requirements.

For example, because the first shield portion 42*b* is disposed inside of the first contact 30*a* in the left-right direction and extends in the front-back direction so as to overlap the first contact 30*a* along the left-right direction, the first shield portion 42*b* shields the first contact 30*a* from the inside in the left-right direction. Thus, the first contact 30*a* is shielded with respect to the second contact 30*b* group, and inflow of noise from the second contact 30*b* group into the first contact 30*a* and outflow of noise from the first contact 30*a* to the second contact 30*b* group are effectively suppressed. As a result, for example, also in high-speed transmission, it is possible to obtain good transmission characteristics for high-frequency signals.

Because the first shield member 40 includes the second shield portion 42*a*, the noise shielding effect is improved. For example, because the second shield portion 42*a* is disposed outside of the first contact 30*a* in the left-right direction and extends in the front-back direction so as to overlap the first contact 30*a* along the left-right direction, the second shield portion 42*a* shields the first contact 30*a* from the outside in the left-right direction. Thus, the first contact 30*a* is shielded from the outside in the left-right direction, and inflow of noise from the outside into the first contact 30*a* and outflow of noise from the first contact 30*a* to the outside are effectively suppressed. As a result, for example, also in high-speed transmission, it is possible to obtain good transmission characteristics for high-frequency signals.

Because the first shield member 40 includes the third shield portion 43*a*, the noise shielding effect is improved. For example, because the third shield portion 43*a* is disposed on each of two sides of the first contact 30*a* in the front-back direction and extends in the left-right direction so as to overlap the first contact 30*a* along the front-back direction, the third shield portion 43*a* shields the first contact 30*a* from each of two sides in the front-back direction. Thus, the first contact 30*a* is shielded from the outside in the front-back direction, and inflow of noise from the outside into the first contact 30*a* and outflow of noise from the first contact 30*a* to the outside are effectively suppressed. As a result, for example, also in high-speed transmission, it is possible to obtain good transmission characteristics for high-frequency signals.

The first shield member 40 includes the first shield portion 42*b*, the second shield portion 42*a*, and the third shield portion 43*a*. Thus, the first contact 30*a* is shielded from four directions, and inflow of noise to the first contact 30*a* and outflow of noise from the first contact 30*a* are more effectively suppressed. As a result, for example, also in high-speed transmission, it is possible to obtain better transmission characteristics for high-frequency signals.

Because the first shield member 40 includes the outer-peripheral-side shield portion 44*a*, the noise shielding effect is improved. For example, because the outer-peripheral-side shield portion 44*a* is disposed outside of the second contact 30*b* in the front-back direction and extends in the left-right direction so as to overlap the second contact 30*b* along the front-back direction, the outer-peripheral-side shield portion 44*a* shields the second contact 30*b* from the outside in the front-back direction. Thus, the second contact 30*b* is shielded from the outside in the front-back direction, and inflow of noise from the outside into the second contact 30*b* and outflow of noise from the second contact 30*b* to the outside are effectively suppressed. As a result, for example, also in high-speed transmission, it is possible to obtain good transmission characteristics for high-frequency signals.

Because the position of the first wall portion 213 in the transversal direction is the same as the position of a central part of the second attachment portion 22 in the transversal direction, it is possible to form the first insulator 20 so as to be symmetrical in the transversal direction and so as to have a small width. Accordingly, reduction of the first insulator 20 in area is realized, and it is possible to reduce the first connector 10 in size. For example, because the number of positions and directions for disposing antennas are increasing in communication terminals in recent years, which are adapted to high-speed transmission, due to the directivity of communication radio waves, reduction in size of a connector incorporated in the communication terminals is required for space-saving. It is also possible for the first connector 10 according to one embodiment to fulfill such requirements.

Because the first wall portion 213 is located at the central part in the transversal direction, that is, because the first wall portion 213 is line-symmetric in the transversal direction, a return path is symmetrically formed by a magnetic field emanated from the first contact 30*a* that is attached so as to be positioned by the first wall portion 213. Therefore, flow in the return path becomes uniform, common mode noise becomes unlikely to be generated, and transmission characteristics for a high-frequency signal is improved.

Because the first connector 10 includes the first contact 30*a* and the second contact 30*b*, whose types differ from each other, the first connector 10 can transmit signals of various types between the circuit board CB1 and the circuit board CB2. Because a plurality of the second contacts 30*b* are disposed on the second attachment portion 22 of the first insulator 20, the second contacts 30*b* are separated from the first contact 30*a*, which is disposed on the first attachment portion 21. Because it is possible to separate the second contact 30*b* from the first contact 30*a* in the first connector 10, the second contact 30*b* can be shielded by using independent shield members. At this time, it is possible to shield the second contact 30*b* from multiple directions, because a sufficient space for providing the shield members can be obtained.

The first contact 30*a* includes a contact that is used to transmit an RF signal and the second contact 30*b* includes a contact that is used to transmit a signal other than an RF signal. By separating the first contact 30*a*, which is used for high-frequency transmission, and the second contact 30*b*, which is used for another purpose, via the first shield portion 42*b*, it is possible to block out noise that is generated due to an RF signal for high-frequency transmission. To be more specific, outflow of the noise from the first contact 30*a* to the second contact 30*b* is effectively suppressed. As a result, for example, also in high-speed transmission, it is possible to obtain good transmission characteristics for high-frequency signals.

The foregoing description of the advantageous effects of the first connector 10 applies also to corresponding constituent parts of the second connector 50 having configurations similar to those of the first connector 10. The second connector 50 according to one embodiment also has advantageous effects similar to those of the first connector 10 described above. In addition, the connector 1 according to one embodiment, which includes the first connector 10 and the second connector 50, also has advantageous effects similar to those of the first connector 10 described above.

In addition, in the connector 1 according to one embodiment, in the fitted state, the contacting portion 34*a* and the elastic contacting portion 73*a*, which are in contact with each other, are shielded, inside in the left-right direction, by the double structure of the first shield portion 42*b* and the fourth shield portion 82*b*, which are in contact with each other. Accordingly, the noise shielding effect is improved. As a result, for example, also in high-speed transmission, it is possible to obtain good transmission characteristics for high-frequency signals.

In the fitted state, because the first shield portion 42*b* and the fourth shield portion 82*b* are in contact with each other, for example, the transmission distance of a signal that flows between the circuit board CB1 and the circuit board CB2 based on the ground pattern is reduced. Because the first shield portion 42*b* and the fourth shield portion 82*b* are in contact with each other, the distance between the mount portion 41*b* of the second member 40*b* and the mount portion 81*b* of the second member 80*b* is reduced, and it is possible to obtain a more sufficient noise reduction effect. Accordingly, for example, also in high-speed transmission, it is possible to obtain good transmission characteristics for high-frequency signals.

In the fitted state, the contacting portion 34*a* and the elastic contacting portion 73*a*, which are in contact with each other, are shielded, outside in the left-right direction, by the second shield portion 42*a* and the fifth shield portion 81*a*, which are in contact with each other. Accordingly, the noise shielding effect is improved. As a result, for example, also in high-speed transmission, it is possible to obtain good transmission characteristics for high-frequency signals.

In the fitted state, the contacting portion 34*a* and the elastic contacting portion 73*a*, which are in contact with each other, are shielded on each of two sides in the front-back direction by the double structure of the third shield portion 43*a* and the sixth shield portion 82*a*, which are in contact with each other. Accordingly, the noise shielding effect is improved. As a result, for example, also in high-speed transmission, it is possible to obtain good transmission characteristics for high-frequency signals.

In the fitted state, the contacting portion 34*a* and the elastic contacting portion 73*a*, which are in contact with each other, are shielded by the double structure of the shield portion from four directions, which are the front, back, left, and right directions. Accordingly, inflow of noise to the first contact 30*a* and the third contact 70*a* and outflow of noise from the first contact 30*a* and the third contact 70*a* are more effectively suppressed. As a result, for example, also in high-speed transmission, it is possible to obtain better transmission characteristics for high-frequency signals.

In the fitted state, the two contacting portions of the second contact 30*b* and the fourth contact 70*b* are shielded, outside in the front-back direction, by the double structure of the outer-peripheral-side shield portion 44*a* and the outer-peripheral-side shield portion 83*a*, which overlap from each other. Accordingly, the noise shielding effect is improved. For example, inflow of noise to the second contact 30*b* and the fourth contact 70*b* from the outside and outflow of noise from the second contact 30*b* and the fourth contact 70*b* to the outside are more effectively suppressed. As a result, for example, also in high-speed transmission, it is possible to obtain better transmission characteristics for high-frequency signals.

It is clear for a person having ordinary skill in the art that the present disclosure can be realized in other predetermined embodiments other than the embodiments described above without departing from the spirit thereof or the essential features thereof. Accordingly, the foregoing description is exemplary, and the present disclosure is not limited to this. The scope of the disclosure is defined not by the foregoing description but by the attached claims. Among all modifications, some of the modifications within the equivalents thereof are included the scope of the disclosure.

For example, the shape, the disposition, the orientation, and the number of each constituent part described above are not limited to those in the forgoing descriptions and the drawings. The shape, the disposition, the orientation, and the number of each constituent part may be determined in any appropriate way as long as the function thereof can be realized.

A method of assembling the first connector 10 and the second connector 50 described above is not limited to what has been described above. A method of assembling the first connector 10 and the second connector 50 may be any method as long as the method allows assembly so that the functions of each of these can be fully exploited. For example, in the first connector 10, at least one of the first contact 30*a* and the first shield member 40 need not be press-fitted into the first insulator 20 but may be integrally formed with the first insulator 20 by insert molding. For example, in the first connector 10, the second contact 30*b* may be attached to the first insulator 20 not by insert molding but by press fitting. For example, in the second connector 50, at least one of the third contact 70*a*, the fourth contact 70*b*, and the second shield member 80 need be integrally formed with not the second insulator 60 by press fitting, but may be integrally formed with the second insulator 60 by insert molding.

In the above embodiment, it has been described that the second contact 30*b* differs from the first contact 30*a*. However, this is not a limitation. The second contact 30*b* may be the same as the first contact 30*a*. The first connector 10 may be connected to the same circuit via the first contact 30*a* and the second contact 30*b*, or may be connected to a circuit of another type.

In the above embodiment, it has been described that the height H1 of the first wall portion 213 is the same as the height H2 of the second wall portion 222*b*. However, this is not a limitation. The height H1 of the first wall portion 213 may differ from the height H2 of the second wall portion 222*b*. For example, the height of the first wall portion 213 may be slightly smaller than that of than the second wall portion 222*b*.

In the above embodiment, it has been described that the first wall portion 213 is formed linearly from one end part of the first attachment portion 21 on the second attachment portion 22 side to the other end part on the opposite side in the left-right direction in a state in which the first contact 30*a* is interposed in the left-right direction. However, this is not a limitation. The first wall portion 213 may be formed linearly and continuously from one end part of the first attachment portion 21 on the second attachment portion 22 side to the other end part on the opposite side in the left-right direction. The first wall portion 213 may be linearly formed in a part of the range from one end part to the other end part, or need not be formed linearly. The first wall portion 213 may be formed of a pair of walls that are separated from each other in the front-back direction, like the third wall portion 621 of the second insulator 60.

In the above embodiment, it has been described that the first connector 10 includes the first shield member 40. However, this is not a limitation. The first connector 10 need not include the first shield member 40.

In the above embodiment, it has been described that the first shield member 40 includes the first shield portion 42*b*, the second shield portion 42*a*, the third shield portion 43*a*, and the outer-peripheral-side shield portion 44*a*. However, this is not a limitation. The first shield member 40 may include at least one of the first shield portion 42*b*, the second shield portion 42*a*, the third shield portion 43*a*, and the outer-peripheral-side shield portion 44*a*.

In the above embodiment, it has been described that the first shield member 40 includes the third shield portion 43*a* on each of two sides in the front-back direction. However, this is not a limitation. The first shield member 40 may include the third shield portion 43*a* only on one side.

In the above embodiment, it has been described that the first shield member 40 includes the first member 40*a* and the second member 40*b*. However, this is not a limitation. The first shield member 40 may be integrally formed as a single member without being divided into two members.

In the above embodiment, it has been described that the first direction is the longitudinal direction of the first connector 10 and the second direction is the transversal direction of the first connector 10. However, this is not a limitation. The first direction may be the transversal direction of the first connector 10, and the second direction may be the longitudinal direction of the first connector 10.

In the above embodiment, it has been described that the position of the first wall portion 213 in the transversal direction is the same as the position of the central part of the second attachment portion 22 in the transversal direction. However, this is not a limitation. The position of the first wall portion 213 in the transversal direction may be the same as the position of a part, other than the central part, of the second attachment portion 22 in the transversal direction.

In the above embodiment, it has been described that the second member 40*b* of the first shield member 40 includes the cutout portion 43*b*. However, this is not a limitation. The second member 40*b* need not include the cutout portion 43*b*. In this case, the first shield portion 42*b* may be formed as one flat plate continuously in the front-back direction. Thus, the noise shielding effect is further improved.

In the above embodiment, for example, as illustrated in FIG. 7, it has been described that the second shield portion 42*a* and the third shield portion 43*a* are coupled with respect to the base portion 41*a* of the first member 40*a*. However, this is not a limitation. The first member 40*a* may include, in addition to the second shield portion 42*a* and the third shield portion 43*a*, an extension portion that extends along the up-down direction from the inside, in the front-back direction, of the base portion 41*a* and that is disposed on each of two sides in the front-back direction with respect to the first contact 30*a*. Thus, the noise shielding effect is further improved. The extension portion may have spring elasticity so as to be capable of elastically deforming along the front-back direction. The extension portion may be in contact with any constituent part of the second shield member 80 in the fitted state.

The foregoing description of the modifications of the first connector 10 applies also to corresponding constituent parts of the second connector 50 having configurations similar to those of the first connector 10. The second connector 50 according to one embodiment may be configured in modifications similar to the modifications related to the first connector 10 described above. In addition, the connector 1 according to one embodiment, which includes the first connector 10 and the second connector 50, may be configured in modifications similar to the modifications related to the first connector 10 described above.

In the above embodiment, the third wall portion 621 of the second insulator 60 includes a pair of the front wall 621*a* and the back wall 621*b* that are separated from each other in the front-back direction. However, this is not a limitation. As with the first wall portion 213, the third wall portion 621 may be formed linearly from one end part of the third attachment portion 62 on the fourth attachment portion 63 side to the other end part on the opposite side in the left-right direction in a state in which the third contact 70*a* is interposed in the left-right direction. The third wall portion 621 may be formed linearly and continuously from one end part of the third attachment portion 62 on the fourth attachment portion 63 side to the other end part on the opposite side in the left-right direction. The third wall portion 621 may be linearly formed in a part of the range from one end part to the other end part, or need not be formed linearly.

In the above embodiment, for example, as illustrated in FIG. 8, the fitting raised portion 632 of the second insulator 60 is generally exposed. However, this is not a limitation. For example, the fitting raised portion 632 of the second insulator 60 may fit with the outer shape of the fitting raised portion 632 and may be covered by any member that extends in the left-right direction and that is made of a metal material. Such a member may continuously extend in the left-right direction from the left end to the right end of the fitting raised portion 632 or may be separated in the left-right direction at a central part of the fitting raised portion 632. Thus, the strength of the fitting raised portion 632 is improved, and, as a result, the strength of the second insulator 60 is also improved.

In the above embodiment, it has been described that the first shield portion 42*b* and the fourth shield portion 82*b* are in contact with each other in the fitted state. However, this is not a limitation. The first shield portion 42*b* and the fourth shield portion 82*b* need not be in contact with each other in the fitted state.

In the above embodiment, it has been described that the second shield portion 42*a* and the fifth shield portion 81*a* are in contact with each other in the fitted state. However, this is not a limitation. The second shield portion 42*a* and the fifth shield portion 81*a* need not be in contact with each other in the fitted state.

In the above embodiment, it has been described that the third shield portion 43*a* and the sixth shield portion 82*a* are in contact with each other in the fitted state. However, this is not a limitation. The third shield portion 43*a* and the sixth shield portion 82*a* need not be in contact with each other in the fitted state.

The mount pattern of each mount portion in the above embodiment is not limited to what has been described above. Each mount portion may be mounted in any mount pattern on the mount surface of a corresponding circuit board.

The connector 1, the first connector 10, or the second connector 50 is mounted in an electronic apparatus including the circuit board CB1 and the circuit board CB2. Examples of the electronic apparatus include any communication terminal devices such as a smartphone; and any information processing machine such as a personal computer, a copier, a printer, a facsimile, and a multifunctional machine. In addition, examples of the electronic apparatus include any industrial equipment.

With such an electronic apparatus, in the connector 1, the strength of an insulator to which a plurality of contacts are attached is improved. Accordingly, the strength of the connector 1 is improved, and breakage of the connector 1 is suppressed. As a result, the reliability of the electronic apparatus as a product is improved. In addition, with such an electronic apparatus, a good noise shielding effect can be obtained in the connector 1. Such an electronic apparatus has good transmission characteristics in signal transmission. Accordingly, the reliability of the electronic apparatus as a product is improved.

REFERENCE SIGNS LIST

1 connector (connector module)
10 first connector (connector)
20 first insulator (insulator)
21 first attachment portion
211 bottom plate portion
212 outer peripheral wall
212*a* first wall
212*b* second wall
213 first wall portion
214 first-contact holding groove
22 second attachment portion
221 bottom plate portion
222 outer peripheral wall
222*a* transversal wall
222*b* longitudinal wall (second wall portion)
223 fitting recess
224 second-contact holding groove
225 first-shield-member holding groove
30*a* first contact
30*b* second contact
31*a* mount portion
31*b* mount portion
32*a* connection portion
32*b* contacting portion
33*a* curved portion
33*b* curved portion
34*a* contacting portion
34*b* contacting portion
35*a* latch portion
35*b* projection
40 first shield member (shield member)
40*a* first member
40*b* second member
41*a* base portion
41*b* mount portion
42*a* second shield portion
42*b* first shield portion
43*a* third shield portion
43*b* cutout portion
44*a* outer-peripheral-side shield portion
44*b* latch portion
45*a* latch portion
45*b* contacting portion
46*a* first mount portion
47*a* second mount portion
48*a* first contacting portion
49*a* second contacting portion
50 second connector (connector)
60 second insulator (insulator)
61 bottom plate portion
62 third attachment portion (first attachment portion)
621 third wall portion (first wall portion)
621*a* front wall
621*b* back wall
622 third-contact holding groove
63 fourth attachment portion (second attachment portion)
631 fourth wall portion (second wall portion)
631*a* front wall
631*b* back wall
632 fitting raised portion
633 fourth-contact holding groove
634 second-shield-member holding groove
64 second-shield-member holding portion
70*a* third contact (first contact)
70*b* fourth contact (second contact)
71*a* mount portion
71*b* mount portion
72*a* latch portion
72*b* latch portion
73*b* elastic contacting portion
73*b* curved portion
74*b* elastic contacting portion
75*b* contacting portion
76*b* contacting portion
80 second shield member (shield member)
80*a* first member
80*b* second member

81*a* fifth shield portion (second shield portion)
81*b* mount portion
82*a* sixth shield portion (third shield portion)
82*b* fourth shield portion (first shield portion)
83*a* outer-peripheral-side shield portion
83*b* cutout portion
84*a* latch portion
84*b* latch portion
85*a* first mount portion
85*b* contacting portion
86*a* second mount portion
87*a* third mount portion
88*a* first contacting portion
89*a* second contacting portion
CB1 circuit board
CB2 circuit board
H1, H2, H3, H4 height
P1, P2, P3, P4 circuit pattern
P3, P6 ground pattern

The invention claimed is:

1. A connector comprising:

an insulator including a first attachment portion to which a first contact is attached and a second attachment portion that is formed continuously with the first attachment portion and to which a second contact is attached, each of the first contact and the second contact comprising a conductive material, wherein the first attachment portion includes a first wall portion to which the first contact is attached, wherein the second attachment portion includes a second wall portion that is separated from the first wall portion and to which the second contact is attached, and wherein the first wall portion and the second wall portion are parallel to one another and connected to each other by a side wall portion that runs perpendicular to the first and second wall portions, wherein the first wall portion extends from the side wall portion in a first direction and the second wall portion extends from the side wall portion in a second direction, and wherein the first direction is opposite the second direction.

2. The connector according to claim 1, wherein the first attachment portion is formed continuously with the second attachment portion along a first direction of the connector to be positioned at an outer end in the first direction, and wherein the first wall portion is formed linearly from one end part of the first attachment portion on the second attachment portion side to the other end part on an opposite side in the first direction.

3. The connector according to claim 1, wherein the second contact differs from the first contact.

4. The connector according to claim 1, comprising:

a shield member that is attached to the insulator, wherein the shield member includes a first shield portion that is disposed at an end part of the second attachment portion on the first attachment portion side and that extends in a second direction perpendicular to a first direction of the connector to overlap the first contact.

5. The connector according to claim 4, wherein the shield member is disposed on a side opposite to the first shield portion with respect to the first contact, and extends in the second direction to overlap the first contact.

6. The connector according to claim 4, wherein the shield member includes a third shield portion that is disposed on each of two sides in the second direction with respect to the first contact to overlap the first contact.

7. The connector according to claim 6, wherein the shield member includes an outer-peripheral-side shield portion that is coupled to the third shield portion and that is disposed outside of the insulator along the first direction to overlap the second contact.

8. The connector according to claim 4, wherein the first direction is a longitudinal direction of the connector, wherein the second direction is a transversal direction of the connector, and wherein a position of the first wall portion in the transversal direction is the same as a position of a central part of the second attachment portion in the transversal direction.

9. A connector module comprising:

a first connector including:

a first contact comprising a conductive material, a second contact comprising a conductive material, and a first insulator including a first attachment portion to which the first contact is attached and a second attachment portion that is formed continuously with the first attachment portion and to which the second contact is attached; and a second connector that is connectable to the first connector, the second connector including a third contact that is in contact with the first contact in a connected state in which the first connector and the second connector are connected to each other, a fourth contact that is in contact with the second contact in the connected state, and a second insulator including a third attachment portion that is fitted to the first insulator in the connected state and to which the third contact is attached and a fourth attachment portion that is formed continuously with the third attachment portion and to which the fourth contact is attached, wherein the first attachment portion includes a first wall portion to which the first contact is attached, wherein the second attachment portion includes a second wall portion that is separated from the first wall portion and to which the second contact is attached, wherein the third attachment portion includes a third wall portion to which the third contact is attached, and wherein the fourth attachment portion includes a fourth wall portion that is separated from the third wall portion and to which the fourth contact is attached, wherein the first wall portion and the second wall portion are parallel to one another and connected to each other by a first side wall portion that runs perpendicular to the first and second wall portions, wherein the first wall portion extends from the first side wall portion in a first direction and the second wall portion extends from the first side wall portion in a second direction, and wherein the first direction is opposite the second direction, and wherein the third wall portion and the fourth wall portion are parallel to one another and connected to each other by a second side wall portion that runs perpendicular to the third and fourth wall portions.

10. The connector module according to claim 9, wherein the first connector includes a first shield member that is attached to the first insulator, wherein the second connector includes a second shield member that is attached to the second insulator, wherein the first shield member includes a first shield portion that is disposed at an end part of the second attachment portion on the first attachment portion side and that extends in a second direction perpendicular to a first direction of the connector module to overlap the first contact, wherein the second shield member includes a fourth shield portion that is disposed at an end part of the fourth attachment portion on the third attachment portion side and that extends in the second direction to overlap the third contact, and wherein the first shield portion and the fourth shield portion are in contact with each other in the connected state.

11. An electronic apparatus comprising the connector according to claim 1.

12. An electronic apparatus comprising the connector according to claim 1, wherein the first contact includes a contact that is used to transmit an RF signal, and wherein the second contact includes a contact that is used to transmit another signal other than an RF signal.

13. A connector comprising:

an insulator including:

a first attachment portion comprising:

a first wall portion elongated in a first direction, and comprising a first end and a second end;

a first side portion elongated in a second direction different from the first direction, and being in contact with the first end;

a second side portion elongated in the second direction, and being in contact with the second end; and a first contact comprising a conductive material and attached to the first wall portion, and separated from the first wall portion; and a second attachment portion adjacent to the first attachment portion, and comprising:

a second wall portion separated from the first wall portion; and a second contact comprising a conductive material and attached to the second wall portion, and wherein the first wall portion and the second wall portion are parallel to one another and connected to each other by a side wall portion that runs perpendicular to the first and second wall portions, wherein the first wall portion extends from the side wall portion in a first direction and the second wall portion extends from the side wall portion in a second direction, and wherein the first direction is opposite the second direction.

14. The connector according to claim 1 comprising a bottom plate portion that extends outward from an end of the second wall portion, and an outer peripheral wall that extends from a surface of the bottom plate portion.

15. The connector according to claim 1, wherein the second attachment portion includes a pair of second wall portions, wherein the first wall portion and the pair of second wall portions are parallel to one another and connected to each other by a pair of side wall portions that run perpendicular to the first and pair of second wall portions, wherein the pair of side wall portions extend in a third direction perpendicular to the first and second directions, wherein the insulator includes an outer peripheral wall including the pair of second wall portions and the pair of side wall portions, and wherein the first wall portion extends linearly in the first direction from only a part of the side wall portion, between the pair of second wall portions in the third direction.

16. The connector module according to claim 9, wherein the second attachment portion includes a pair of second wall portions, wherein the first wall portion and the pair of second wall portions are parallel to one another and connected to each other by a pair of side wall portions that run perpendicular to the first and pair of second wall portions, wherein the pair of side wall portions extend in a third direction perpendicular to the first and second directions, wherein the insulator includes an outer peripheral wall including the pair of second wall portions and the pair of side wall portions, and wherein the first wall portion extends linearly in the first direction from only a part of the side wall portion, between the pair of second wall portions in the third direction.

17. The connector according to claim 13, wherein the second attachment portion includes a pair of second wall portions, wherein the first wall portion and the pair of second wall portions are parallel to one another and connected to each other by a pair of side wall portions that run perpendicular to the first and pair of second wall portions, wherein the pair of side wall portions extend in a third direction perpendicular to the first and second directions, wherein the insulator includes an outer peripheral wall including the pair of second wall portions and the pair of side wall portions, and wherein the first wall portion extends linearly in the first direction from only a part of the side wall portion, between the pair of second wall portions in the third direction.

* * * * *